(12) United States Patent
Gupta et al.

(10) Patent No.: US 11,869,490 B1
(45) Date of Patent: Jan. 9, 2024

(54) MODEL CONFIGURATION

(71) Applicant: Amazon Technologies, Inc., Seattle, WA (US)

(72) Inventors: Rahul Gupta, Waltham, MA (US); Jwala Dhamala, Boston, MA (US); Melanie C B Gens, Seattle, WA (US); Sachin Midha, Bothell, WA (US); Jennifer Yuen, Seattle, WA (US); Dewan Muhammed Ibtesham, Redmond, WA (US); Wael Hamza, Yorktown Heights, NY (US); Xinhong Zhang, Mercer Island, WA (US); Md Humayun Arafat, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 452 days.

(21) Appl. No.: 16/993,482

(22) Filed: Aug. 14, 2020

(51) Int. Cl.
| | |
|---|---|
| *G10L 15/183* | (2013.01) |
| *G10L 15/06* | (2013.01) |
| *G06N 3/08* | (2023.01) |
| *G06N 20/00* | (2019.01) |

(52) U.S. Cl.
CPC .............. *G10L 15/183* (2013.01); *G06N 3/08* (2013.01); *G06N 20/00* (2019.01); *G10L 15/063* (2013.01)

(58) Field of Classification Search
CPC ....... G10L 15/183; G10L 15/063; G06N 3/08; G06N 20/00
See application file for complete search history.

(56) References Cited

U.S. PATENT DOCUMENTS

| | | | |
|---|---|---|---|
| 2016/0189055 A1* | 6/2016 | Zvitia | G05B 19/41875 706/11 |
| 2019/0042887 A1* | 2/2019 | Nguyen | G06K 9/6257 |
| 2019/0095785 A1* | 3/2019 | Sarkar | G06N 3/0472 |
| 2019/0392001 A1* | 12/2019 | Carothers | G06N 3/084 |
| 2020/0242400 A1* | 7/2020 | Perkins | G06K 9/6256 |
| 2020/0279187 A1* | 9/2020 | Huang | G06F 11/3428 |
| 2020/0356011 A1* | 11/2020 | Su | G03F 7/705 |
| 2021/0042708 A1* | 2/2021 | Gardiner | G06Q 30/0284 |
| 2021/0065064 A1* | 3/2021 | Xu | G06N 20/20 |
| 2021/0081837 A1* | 3/2021 | Polleri | G06N 20/00 |
| 2021/0383223 A1* | 12/2021 | Tan | G06N 3/08 |
| 2022/0086466 A1* | 3/2022 | Holland | H04N 19/159 |

\* cited by examiner

*Primary Examiner* — Bhavesh M Mehta
*Assistant Examiner* — Philip H Lam
(74) *Attorney, Agent, or Firm* — PIERCE ATWOOD LLP

(57) ABSTRACT

Techniques for tuning parameters for machine learning models are described. Different values for a parameter are tested to determine the value that results in an optimized model. A parameter value may be selected for testing using a search algorithm based on how the model performs with respect to other values for the parameter. Different values may be tested until a stopping criterion (such as time for testing, number of trials, amount of enhancement in performance, etc.) is met. In some embodiments, the techniques may be used to determine parameter values for natural language processing models.

21 Claims, 16 Drawing Sheets

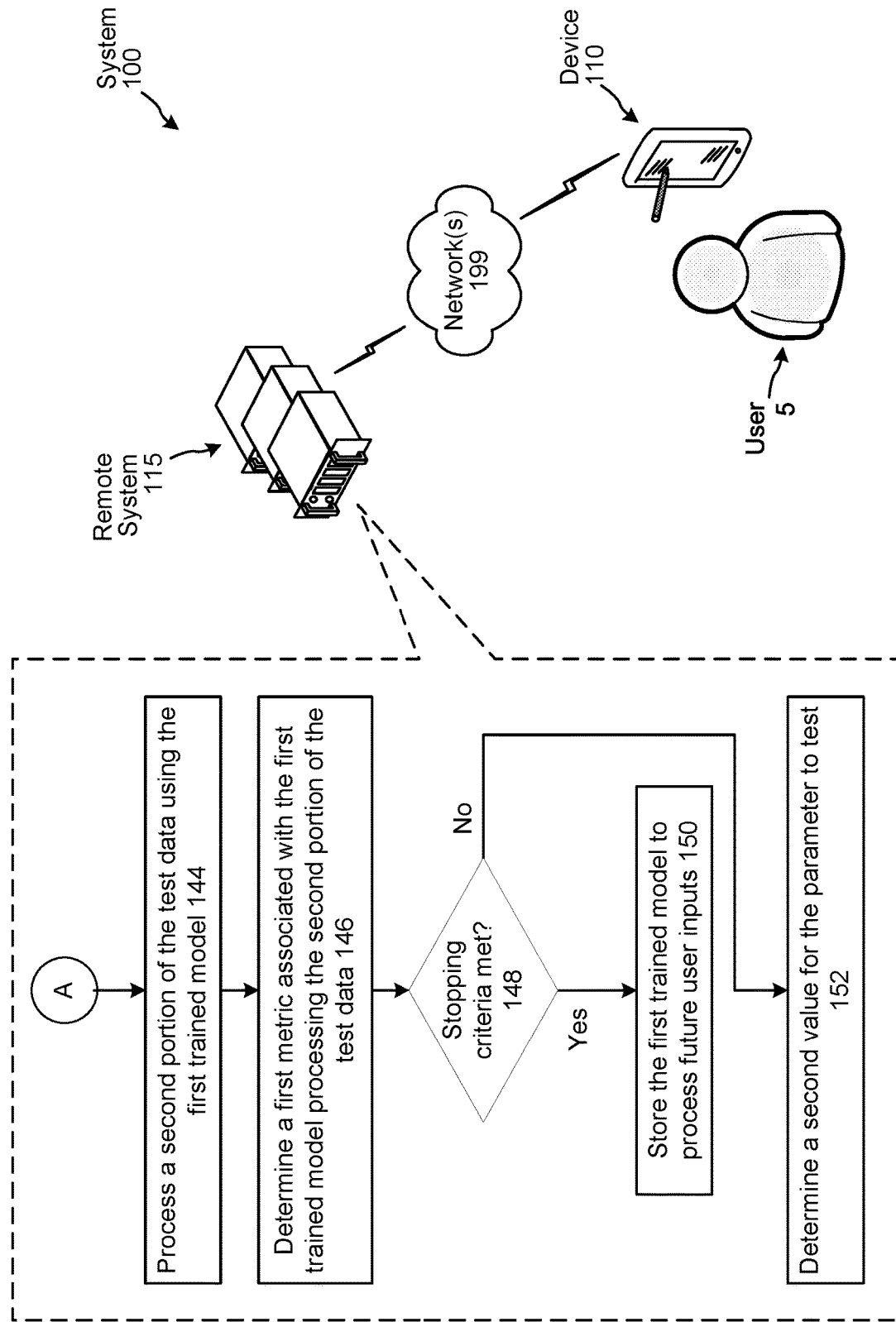

MODEL CONFIGURATION

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as natural language processing (NLP). NLP may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B are conceptual diagrams illustrating a system configured to tune parameter values for a machine learning model, according to embodiments of the present disclosure.

DETAILED DESCRIPTION

Figure 1A:
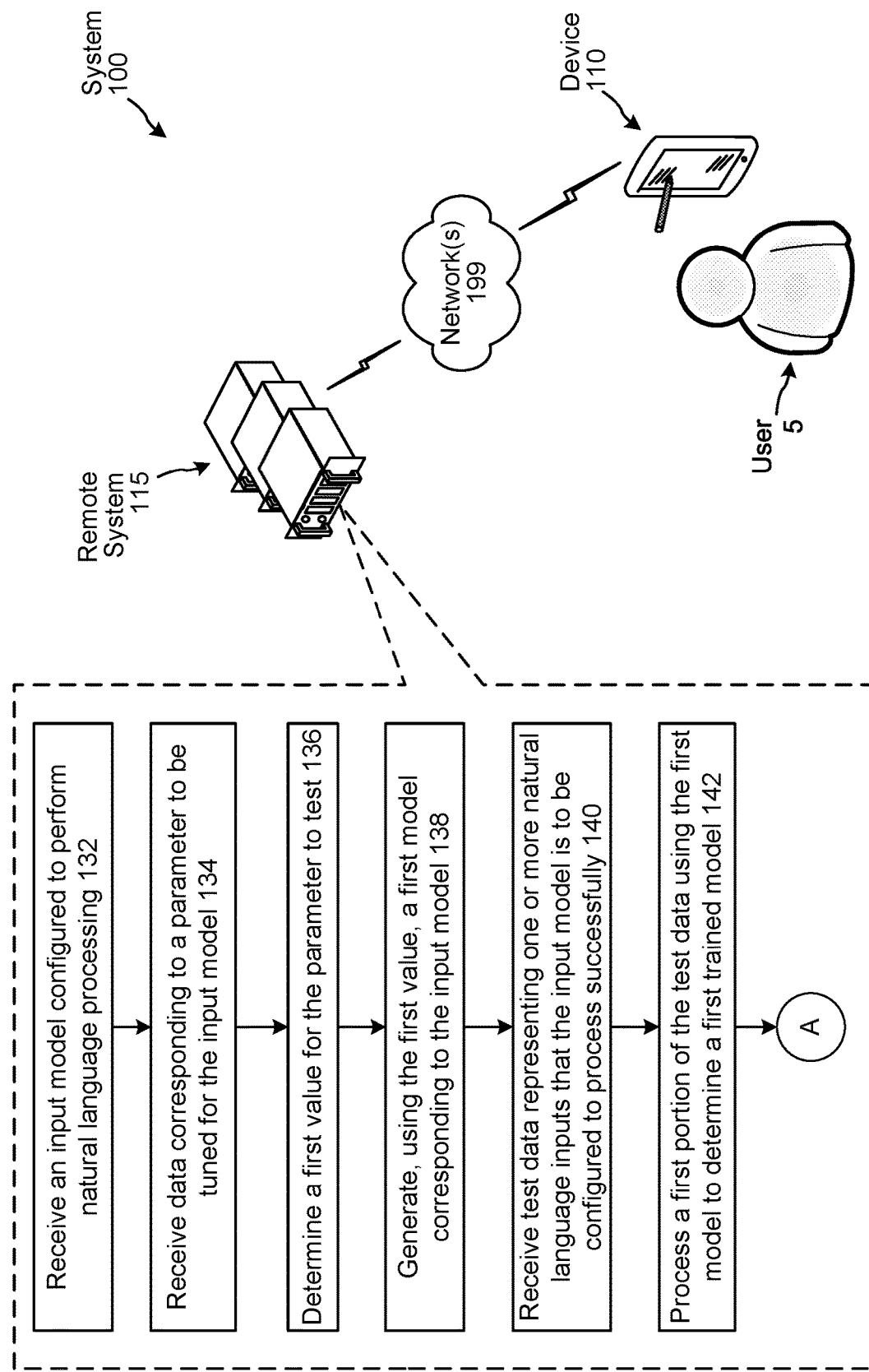

Machine learning (ML) models can be used for processing various types of data and performing various types of tasks. For example, machine learning models may be used to perform automatic speech recognition (ASR) processing, natural language understanding (NLU) processing, user recognition processing using speech, text-to-speech (TTS) processing, application/component routing, etc. ML models are often trained/configured using training data to perform a particular task.

Configuring an ML model often involves determining various parameters, such as hyper-parameters, weights, architecture, and other types of data associated with the model. These parameters depend on the type of ML model being configured. For example, while configuring a neural network, the hyper-parameters that are determined may relate to a number of layers in the network, a learning rate, a number of neurons in the network, a number of hidden layers, batch size, number of epochs, etc. In another example, configuring a support vector machine (SVM) may involve determining a kernel (a type of hyper-parameter).

Certain parameters, such as model weights, may be determined by training the ML model. Hyper-parameters can be tuned so that the configured ML model processes data within some defined metric, where the metric may relate to processing accuracy or efficiency of the ML model. Tuning of a hyper-parameter refers to determining a value for the parameter that causes the ML model to perform in accordance to a particular metric. For example, changing a hyper-parameter value (either by increasing or decreasing the value) may cause the processing accuracy or processing efficiency of the ML model to change (e.g., cause it to improve).

Automatic speech recognition (ASR) is a field of computer science, artificial intelligence, and linguistics concerned with transforming audio data associated with speech into a token, textual, or other meaning representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a remote system. Text-to-speech (TTS) is a field of computer science concerning transforming textual and/or other data into audio data that is synthesized to resemble human speech.

A system may use one or more ML models to perform various stages of NLU processing with respect to a user input. As part of NLU processing, the system may determine an intent of the user input (referred to as intent classification (IC) processing), one or more entities corresponding to the user input (referred to as named entity recognition (NER) processing), a domain corresponding to the user input (referred to as domain classification (DC) processing), one or more skills/applications corresponding to the user input (referred to as post-ranker processing), and other processes. An ML model may be (re)trained on a periodic basis to update the data the ML model is able to process successfully. The ML model may be (re)trained using user inputs recently received by the system. The ML model may be (re)trained to add new user inputs to the data that the ML model is able to process successfully.

The present disclosure describes systems and methods for tuning various parameters of a ML model. The system of the present disclosure, in some embodiments, determines a set of values to test for a parameter, configures a ML model using a value selected from the set, and evaluates the configured ML model to determine whether the selected value improves performance of the ML model with respect to a metric. In testing different values for a parameter, the system, in some embodiments, may also consider a stopping criterion, and may stop testing values for the parameter when the stopping criterion is reached. The stopping criterion may indicate a number of values to test, an amount of time to spend testing different values, an amount of difference achieved in a performance metric, and other criteria. The system may tune parameters for a ML model during retraining of the ML model or during initial configuration of the ML model.

The system may receive as input ML model data, one or more parameters to tune, parameter value information (e.g., a range of valid values for the parameter, a type of values (e.g., discrete, continuous, integers, etc.)), a metric to be enhanced, test data, training data, and other information for tuning parameters for the provided ML model.

In some cases, the system processes weighted file data in configuring a ML model. In some embodiments, the system may also determine the weights for such file data. For example, the file data may include a set of user inputs that the system is to be configured to process successfully, and each user input may be associated with a weight.

FIGS. 1A and 1B illustrate a system 100 configured to tune parameters (like hyper-parameters) for a ML model. Although the figures and discussion of the present disclosure illustrate certain steps in a particular order, the steps described may be performed in a different order (as well as certain steps removed or added) without departing from the present disclosure. As shown in FIGS. 1A and 1B, the system 100 may include a device 110 (local to a user 5) in communication with a remote system 115 across one or more networks 199.

The device 110 may be a computing device (e.g., a laptop, a desktop, a tablet, etc.) that may be used by the user 5 to initiate tuning of parameters for a ML model. The remote system 115 may be configured for offline operations of training and configuring ML models for a NLP system (such as the NLP system 120 of FIG. 2). In some embodiments, the same system(s) may perform the offline operations (of training and configuring ML models) and the online/runtime operations (of processing incoming user inputs).

The remote system 115 receives (132) an input model configured to perform one or more functionalities corresponding to natural language processing. As used herein, natural language processing may involve performing NLU processing (as described below) and routing of the user input to appropriate components (e.g., a skill) to cause an appropriate response/output from the NLP system 120 to the user input. The user 5, using the device 110, may provide data corresponding to the input model for which parameters are to be tuned. The data provided by the user 5 may indicate a location of where the input model data is stored and can be accessed by the remote system 115. The data provided by the user 5 may be the name of the input model. The input model may be a ML model described below in relation to FIGS. 2-5 that may be implemented by the NLP system 120 to process natural language inputs. For example, the input model may be a domain classification (DC) model, an intent classification (IC) model, a named entity recognition (NER) model, one or more models implemented by a dynamic routing component 275, and other models.

The remote system 115 receives (134) data corresponding to a parameter to be tuned for the input model. The data may indicate one or more parameters to be tuned for the input model. Example parameters that may be tuned include a learning rate, a batch size, number of layers, number of hidden layers, dropout rate, kernel size, epochs, pooling size, etc. The data may also indicate the range of values the parameter can be, by indicating lower and upper bounds for the value. For example, the data may indicate the range of values: [0000.1, 1.0], [0, 100], etc. The data may also indicate the type of value the parameter can be. For example, the data may indicate that the parameter can be an integer or a float value, or that the parameter can be a continuous value or a discrete value. In some embodiments, the remote system 115 may tune multiple parameters for the input model, and the received data may indicate a list of parameters that are to be tuned.

The remote system 115 determines (136) a first value for the parameter to test. The remote system 115 may employ a search strategy (described in detail below with respect to a value search component 802) to determine a set of values to test for the parameter, where the set of values may be determined to result in an optimized model (i.e. a model that has a better metric/performance metric than the input model). The remote system 115 generates (138) a first model corresponding to the input model with the parameter set to the first value. That is, the input model may be associated with an initial value for the parameter that is different than the first value associated with the first model that is going to be evaluated by the remote system 115.

The remote system 115 receives (140) test data representing one or more natural language user inputs that the input model is to be configured to process successfully. The test data may include text data representing the natural language inputs or token data corresponding to the natural language inputs. In some embodiments, the remote system 115 may use a portion of the test data to train the first model and another portion of the test data to evaluate the first model, so as to avoid overfitting the first model to the test data. The remote system 115 processes (142) a first portion of the test data to train the first model and determine a first trained model. The first trained model may be referred to as the first test case/trial using the first value for the parameter.

Referring to FIG. 1B, the remote system 115 processes (144) a second portion of the test data using the first trained model to evaluate the first trained model. The remote system 115 determines (146) a first metric associated with the first trained model processing the second portion of the test data. The first metric may be a performance metric associated with the processing of the first trained model. The first metric may indicate a performance accuracy or a performance efficiency associated with the first trained model when processing the second portion of the test data. For models of the NLP system 120, the first metric may be a semantic error rate, a domain classification error rate, an intent classification error rate, a perplexity rate, etc. The user 5 may provide data indicating which metric corresponding to the input model the remote system 115 is to use to determine whether a test case/trial results in an optimized model.

After determining the first metric, the remote system 115 determines (148) whether a stopping criteria has been met. The user 5 may provide one or more stopping criteria (e.g., via the device 110) indicating when the remote system 115 is to stop testing values for the parameter. The stopping criteria may relate to the number of trials (e.g., a maximum number of different parameter configurations) the remote system 115 is to test. As used herein, a trial may refer to a set of values for different parameters used to test a model. For example, a first trial may use a first set of values: {parameter_1=value 1; parameter_2=value 2; parameter_3=value 3}, and a second trial may use a second set of values: {parameter_1=value 1; parameter_2=value 2; parameter_3=value 4}, where parameter_1 may be a learning rate, parameter_2 may be a number of layers, and parameter_3 may be a batch size. The stopping criteria may relate to the amount of time the remote system 115 is to spend testing parameter values. The stopping criteria may relate to a minimum number of iterations (epochs) the remote system 115 is to perform across the trials. The stopping criteria may relate to an amount of improvement to be achieved with respect to the metric. The amount of improvement may be a value (e.g., 0.0001) beyond which the metric stops improving within a number of trials, then evaluation of further values is to cease. For example, during the most recently performed 10 trials, the improvement in the metric may not be more than the amount of improvement indicated in the stopping criteria, e.g., 0.0001. This may indicate that performing more trials may not result in a significant change in the metric. In some embodiments, an early stopping criteria may be implemented when a model is being configured to using a test parameter value, and the remote system 115 determines that the particular model configuration is causing a divergence in the model (rather than a convergence). In this case, the remote system 115 may not perform any further processing/evaluations of the particular model configuration, and may discard or remove the selected test parameter value as a potential viable test value for the parameter. This early stopping criteria may be checked at step 138 or step 148, in some embodiments.

If the stopping criteria is satisfied after determining the first metric, then the remote system 115 stores (150) the first trained model to process future user inputs. The first trained model may be stored such that it is used during online/runtime operations of the NLP system 120 to process future incoming user inputs. A user input may be a natural language user input, which may be a spoken input, a text input, received sensor data corresponding to stored natural language text, image data corresponding to stored natural language text, image data representing a gesture(s) corresponding to stored natural language text, and other forms of inputs.

If the stopping criteria is not satisfied after determining the first metric, then the remote system 115 repeats (152) steps 138, 142, 144, 146 and 148 with respect to a second value for the parameter. That is, the remote system 115 generates a second model corresponding to the input model with the parameter set to the second value. Then the remote system 115 processes the first portion of the test data using the second model to determine a second trained model (a second test case/trial), and processes a second portion of the test data using the second trained model to evaluate the second value for the parameter. In some embodiments, the remote system 115 may use different portions of the test data to train and evaluate the second model as compared to the portions of the test data used to train and evaluate the first model. The remote system 115 determines a second metric associated with the second trained model processing the second portion of the test data, and determines whether the stopping criteria is met. The remote system 115 may continue to perform steps 138, 142, 144, 145 and 148, with respect to different parameter values, until the remote system 115 determines the stopping criteria is satisfied, at which time the remote system 115 stores the last tested trained model.

In some embodiments, the remote system 115 may perform parameter tuning when processing of the test data by the input model results in a failure condition, where the failure condition indicates that the NLP system 120 would provide an undesired response (e.g., an error, stop processing without providing a response, providing a response that does not relate to the user input/user's intended input, etc.). Such failure condition may be caused when one or more NLP models associate inaccurate NLU data/hypothesis (e.g., intent, domain, and/or entity values) to the user input. For example, a user input relating to the music domain may be determined as relating to the shopping domain by the input model. The failure condition may be a result of changes to the input model or the input model not being configured accurately to process the user input. Based on the failure condition occurring, the remote system 115 may determine to initiate parameter tuning for the input model as described herein.

At step 148, in some embodiments, the remote system 115 may determine whether the processing of the test data by the first trained model (or other test cases/trials) results in a success condition, where the NLP system 120 would provide a desired response to the user input. Such success condition may be caused when the one or more NLP models associates the accurate NLU data/hypothesis (e.g., intent, domain, and/or entity values) to the user input. For example, a user input relating to the music domain is accurately associated with the music domain by the NLP system 120.

In some embodiments, the remote system 115 may trigger parameter tuning at defined intervals (e.g., every 6 months, every month, etc.) to update one or more ML models of the NLP system 120, for example, to configure the ML model(s) to process any additional or new user inputs/data.

In some embodiments, the remote system 115 may trigger parameter tuning based on evaluating data (first dataset) used to previously configure the parameters of the ML model(s) and data (second dataset) to be used to configure the parameters of the ML model(s). For example, the remote system 115 may measure the difference or distribution between the first dataset and the second dataset by using information theoretic metrics such as Population Stability Index, Kolmogorov-Smirnov statistic, Kullback-Leibler divergence or histogram intersection. The first dataset and second dataset may include a set of natural language inputs, which may be labeled or unlabeled. In the case the user inputs are labeled, the labels may indicate an intent, one or more slot values, a domain, or other information corresponding to the inputs that facilitates processing by the NLP system 120. In measuring the difference or distribution between the two datasets, the remote system 115 may determine a distance metric between the inputs represented in the two datasets to determine whether the second dataset is different enough that parameter tuning for one or more ML models should be performed. In some embodiments, the remote system 115 may measure the difference or distribution between the two datasets based on a semantic similarity of the inputs represented in the datasets.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

Figure 2:
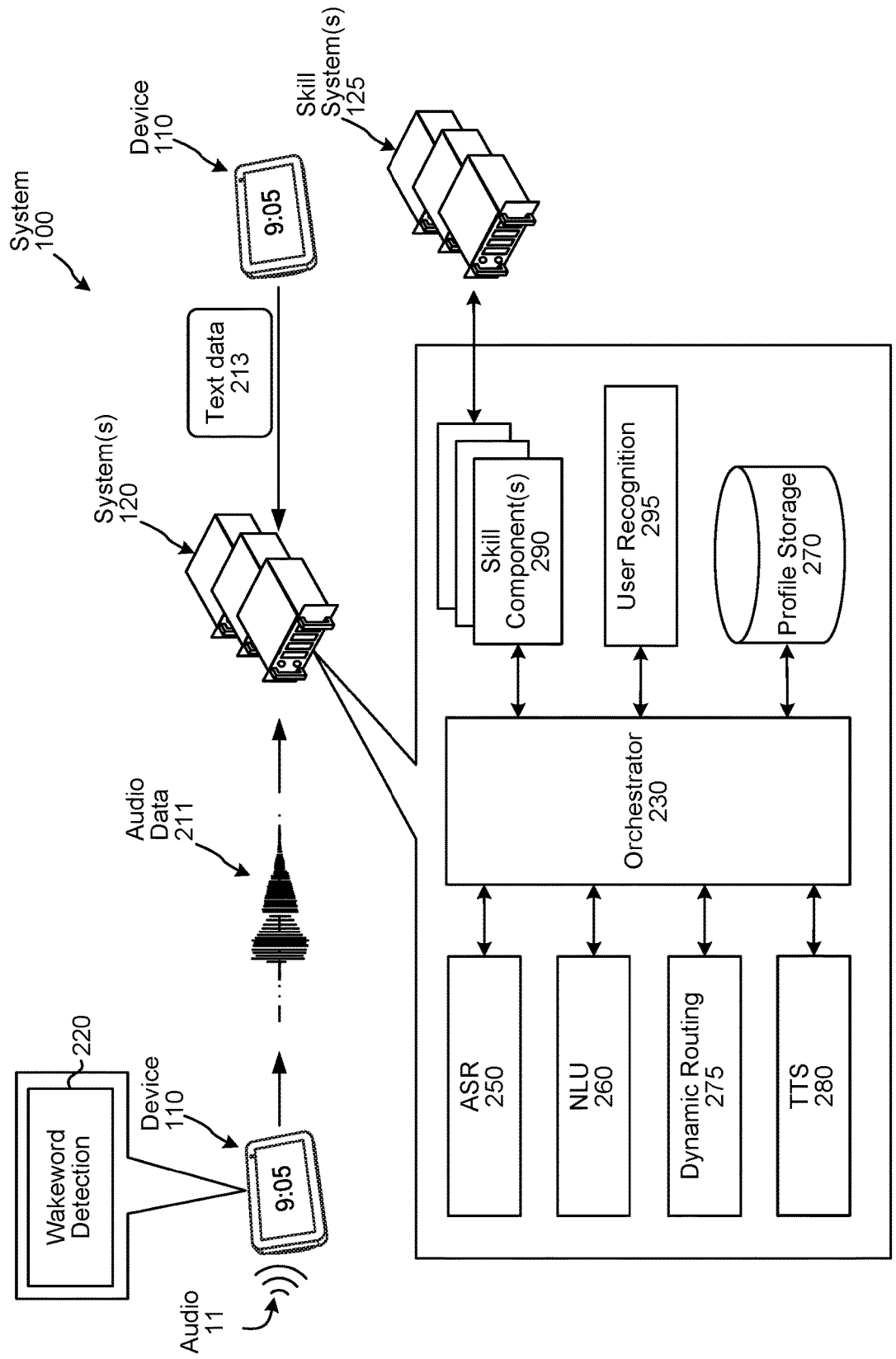
FIG. 2 is a conceptual diagram of components of a system, according to embodiments of the present disclosure.

The system 100 may operate using various components as illustrated in FIG. 2. The various components may be located on a same or different physical devices. Communication between various components may occur directly or across a network(s) 199.

A microphone or array of microphones (of or otherwise associated with the device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when the user intends to speak an input to the system 120. The device 110 may be configured to detect various wakewords. In at least some examples, each wakeword may correspond to a different digital assistant. In at least some examples, a wakeword may correspond to a name of a digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the system 120. The audio data 211 may include data corresponding to the detected wakeword, or the device 110 may remove the portion of the audio corresponding to the detected wakeword prior to sending the audio data 211 to the system 120.

The system 120 may include an orchestrator component 230 configured to receive the audio data 211 from the device 110. The orchestrator component 230 may send the audio data 211 to an ASR component 250.

The ASR component 250 transcribes the audio data 211 into ASR output data including one or more ASR hypotheses. ASR output data may include one or more textual interpretations (corresponding to one or more ASR hypotheses), or may be configured in another manner, such as one or more tokens. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

Alternatively, the device 110 may receive a text-based (e.g., typed) natural language input. The device 110 may generate text data 213 representing the typed natural language input, and may send the text data 213 to the system 120, wherein the text data 213 is received by the orchestrator component 230.

Figure 3:
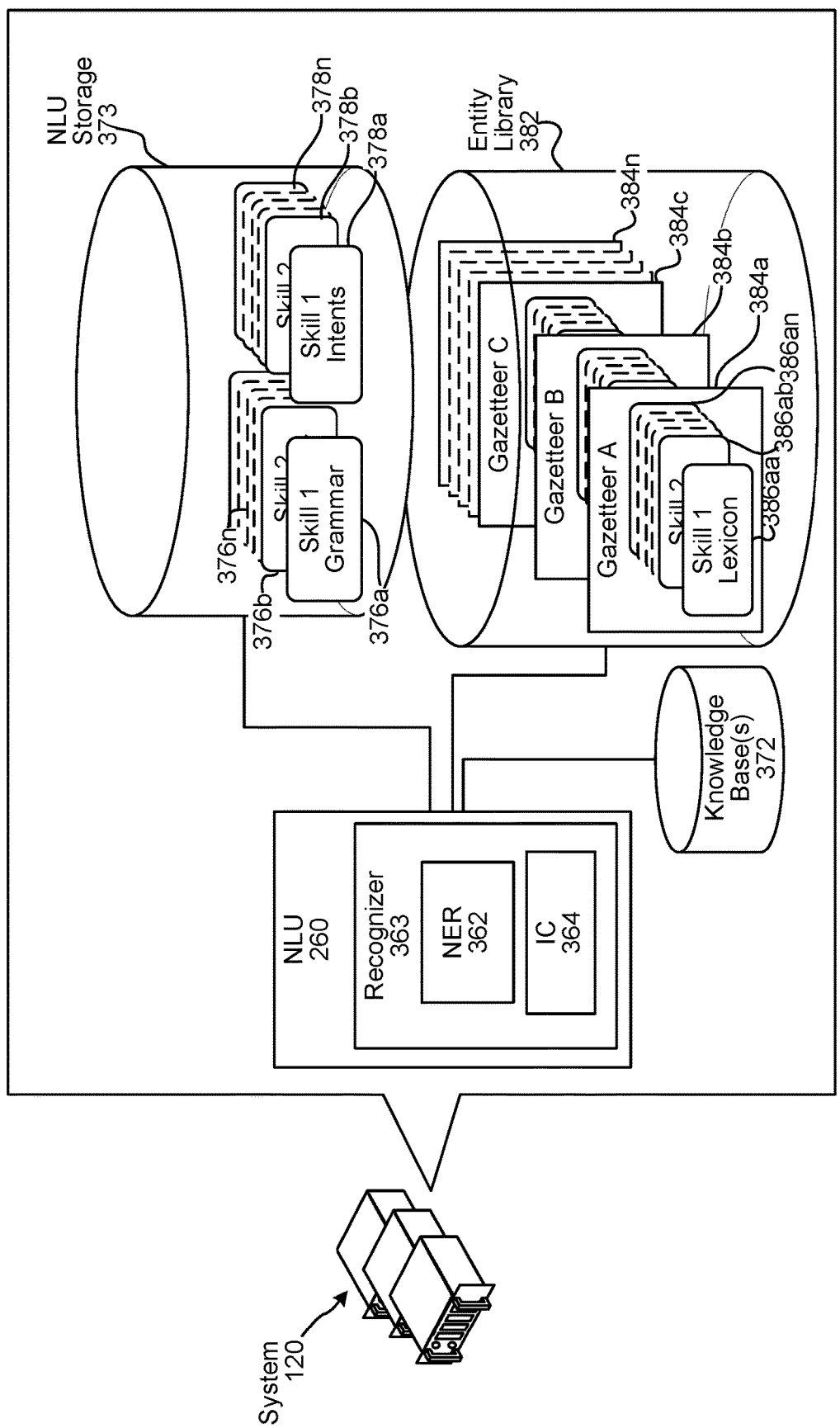
FIG. 3 is a conceptual diagram of how natural language understanding (NLU) processing may be performed, according to embodiments of the present disclosure.
Figure 4:
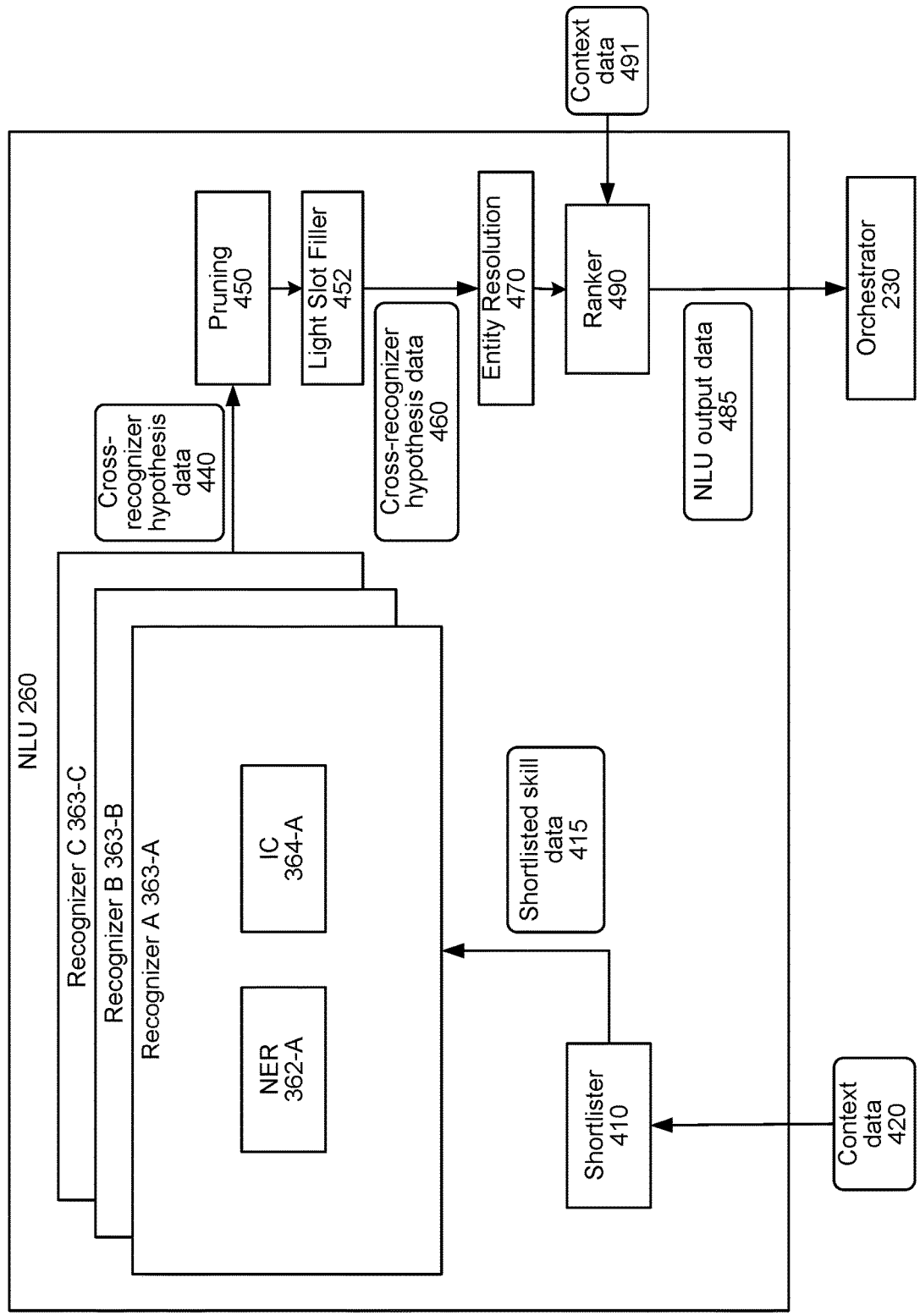
FIG. 4 is a conceptual diagram of how NLU processing may be performed, according to embodiments of the present disclosure.

The orchestrator component 230 may send the text data 213 or ASR output data output, depending on the type of natural language input received, to a NLU component 260. FIGS. 3-4 illustrate how the NLU component 260 may perform NLU processing. For reference, as used below, a "skill" may refer to a skill component 290, a skill system 125, or a combination of a skill component 290 and an associated skill system 125.

The NLU component 260 may include one or more recognizers 363 configured to perform domain classification. In at least some embodiments, a recognizer 363 may be associated with a skill (e.g., the recognizer may be configured to interpret a natural language input to correspond to the skill). In at least some other embodiments, a recognizer 363 may be associated with a domain (e.g., the recognizer may be configured to interpret a natural language input to correspond to the domain). A non-limiting list of domains includes a smart home domain, a music domain, a video domain, a flash briefing domain, a shopping domain, a communications domain, and a custom domain.

Recognizers 363 may process in parallel, in series, partially in parallel, etc. For example, a recognizer corresponding to a first skill may process at least partially in parallel to a recognizer corresponding to a second skill. For further example, a recognizer corresponding to a first domain may process at least partially in parallel to a recognizer corresponding to a second domain. In another example, a recognizer corresponding to a skill may process at least partially in parallel to a recognizer corresponding to a domain.

The NLU component 260 may communicate with an NLU storage 373 including skill grammars (376a-376n), representing how natural language inputs may be formulated to invoke skills, and skill intents (378a-378n) representing intents supported by respective skills. While not illustrated, the NLU storage 373 may also or alternatively include domain grammars, representing how natural language inputs may be formulated to invoke domains, and domain intents representing intents supported by respective domains.

Each recognizer 363 may be associated with a particular grammar 376, one or more particular intents 378, and a particular personalized lexicon 386 (stored in an entity library 382). A gazetteer 384 may include skill-indexed (or domain-indexed) lexical information associated with a particular user. For example, Gazetteer A (384a) may include skill-indexed (or domain-indexed) lexical information 386aa to 386an. A user's music skill (or music domain) lexical information might include album titles, artist names, and song names, for example, whereas a user's contact list skill (or contact list domain) lexical information might include the names of contacts. Since every user's music collection and contact list is presumably different, this personalized information may improve entity resolution.

Each recognizer 363 may include a named entity recognition (NER) component 362 that attempts to identify grammars and lexical information that may be used to construe meaning with respect to text data/ASR output data input therein. An NER component 362 identifies portions of text data/ASR output data that correspond to a named entity that may be recognizable by the system 120. An NER component 362 may also determine whether a word refers to an entity that is not explicitly mentioned in the text data/ASR output data, for example "him," "her," "it" or other anaphora, or the like.

An NER component 362 applies grammar models 376 and lexical information 386 associated with one or more skills (or one or more domains) to determine a mention of one or more entities in text data/ASR output data input therein. In this manner, an NER component 362 identifies "slots" (i.e., particular words in text data/ASR output data) that may be needed for later processing. An NER component 362 may also label each slot with a type (e.g., noun, place, city, artist name, song name, etc.).

Each grammar model 376 may include the names of entities (i.e., nouns) commonly found in natural language corresponding to a particular skill (or domain) to which the grammar model 376 relates, whereas lexical information 386 may be personalized to the user identifier output by a user recognition component 295 for the natural language input. For example, a grammar model 376 associated with a shopping skill (or domain) may include a database of words commonly used when people discuss shopping.

Each recognizer 363 may also include an intent classification (IC) component 364 that processes text data/ASR output data to determine an intent(s) of a skill(s) (or domain(s)) that potentially corresponds to the natural language input represented in the text data/ASR output data. An intent corresponds to an action to be performed that is responsive to the natural language input. An IC component 364 may communicate with a database 378 of words linked to intents. For example, a music intent database may link words and phrases such as "quiet," "volume off," and "mute" to a <Mute> intent. An IC component 364 identifies potential intents by comparing words and phrases in text data/ASR output data to the words and phrases in an intents database 378 associated with the skill(s) (or domain(s)) that is associated with the recognizer 363 implementing the IC component 364.

The intents identifiable by a specific IC component 364 may be linked to one or more skill-specific (or domain-specific) grammar frameworks 376 with "slots" to be filled. Each slot of a grammar framework 376 corresponds to a portion of text data/ASR output data that an NER component 362 believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may identify words in text data/ASR output data as subject, object, verb, preposition, etc. based on grammar rules and/or models prior to recognizing named entities in the text data/ASR output data. An IC component 364 (implemented by the same recognizer 363 as the NER component 362) may use the identified verb to identify an intent. The NER component 362 may then determine a grammar model 376 associated with the identified intent. For example, a grammar model 376 for a <PlayMusic> intent may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in the text data/ASR output data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data/ASR output data using heuristic grammar rules, or a model may be constructed using techniques such as hidden Markov models, maximum entropy models, log linear models, conditional random fields (CRF), and the like. For example, an NER component 362, implemented by a music skill or music domain recognizer 363, may parse and tag text data/ASR output data corresponding to "play mother's little helper by the rolling stones" as {Verb}: "Play," {Object}: "mother's little helper," {Object Preposition}: "by," and {Object Modifier}: "the rolling stones." The NER component 362 may identify "Play" as a verb based on a word database associated with the music skill or music domain, which an IC component 364 may determine corresponds to a <PlayMusic> intent. At this stage, no determination has been made as to the meaning of "mother's little helper" and "the rolling stones," but based on grammar rules and models, the NER component 362 has determined that these phrases relates to the grammatical object (i.e., entity).

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (in the knowledge base 372). For example, if the text data/ASR output data corresponds to "play songs by the rolling stones," after failing to determine an album name or song name called "songs" by "the rolling stones," the NER component 362 may search a music skill (or music domain) vocabulary for the word "songs." In the alternative, generic words may be checked before the gazetteer information, or both may be tried, potentially producing two different results.

A recognizer 363 may tag text data/ASR output data to attribute meaning thereto. For example, a recognizer 363 may tag "play mother's little helper by the rolling stones" as: {skill} Music, {intent} Play Music, {artist name} rolling stones, {media type} SONG, and {song title} mother's little helper. For further example, a recognizer 363 may tag "play songs by the rolling stones" as: {domain} Music, {intent} Play Music, {artist name} rolling stones, and {media type} SONG.

As described above, more than one recognizer 363 may process with respect to text data/ASR output data representing a single natural language input. In such instances, each recognizer 363 may output at least one NLU hypothesis including an intent indicator (determined by an IC component 364 of the recognizer 363) and at least one tagged named entity (determined by an NER component 362 of the recognizer 363).

The NLU component 260 may include a shortlister component 410 (as illustrated in FIG. 4). The shortlister component 410 selects skills that may execute in response to the natural language input. The shortlister component 410 thus limits downstream, more resource intensive NLU processes to being performed with respect to skills that are likely to execute in response to the natural language input.

Without a shortlister component 410, the NLU component 260 may process text data/ASR output data with respect to every skill of (or in communication with) the system 120, either in parallel, in series, or using some combination thereof. By implementing a shortlister component 410, the NLU component 260 may process text data/ASR output data with respect to only skills that are likely to execute in response to the natural language input. This reduces total compute power and latency attributed to NLU processing.

The shortlister component 410 may include one or more trained models. The model(s) may be trained to recognize various forms of natural language inputs that may be received by the system 120. For example, during a training period, a skill may provide the system 120 with training data representing sample natural language inputs that may be used to invoke the skill. For example, a ride sharing skill may provide the system 120 with training data corresponding to "get me a cab to [location]," "get me a ride to [location]," "book me a cab to [location]," "book me a ride to [location]," etc. The one or more trained models, to be used by the shortlister component 410, may be trained using the training data to determine other potentially related natural language input structures that a user may try to use to invoke the skill. During training, the system 120 may query the skill regarding whether the determined other natural language input structures are permissible to be used to invoke the skill at runtime. The alternate natural language input structures may be derived by one or more trained models during model training and/or may be based on natural language input structures provided by different skills. The skill may also provide the system 120 with training data indicating grammar and annotations.

The system 120 may use the training data representing the sample natural language inputs, the determined related natural language input(s), the grammar, and the annotations to train a model that indicates when a runtime natural language input is likely to be handled by a skill. Each trained model of the shortlister component 410 may be trained with respect to a different skill. Alternatively, the shortlister component 410 may use one trained model per skill type, such as one trained model for weather skills, one trained model for ride sharing skills, etc.

The system 120 may use the sample natural language inputs provided by a skill, and related sample natural language inputs determined during training, as binary examples to train a model associated with the skill. For example, some sample natural language inputs may be positive training examples (e.g., natural language inputs that may be used to invoke the skill), while other sample natural language inputs may be negative training examples (e.g., natural language inputs that may not be used to invoke the skill).

As described above, the shortlister component 410 may include a different trained model for each skill or a different trained model for each skill type. Alternatively, the shortlister component 410 may include a single model that includes a portion trained with respect to characteristics (e.g., semantic characteristics) shared by all skills. The single model may also include skill-specific portions, with each skill-specific portion being trained with respect to a different skill. Implementing a single model with skill-specific portions may result in less latency than implementing a different trained model for each skill because the single model with skill-specific portions limits the number of characteristics processed on a per skill level.

The portion of the model, trained with respect to characteristics shared by more than one skill, may be clustered based on skill type. For example, a first portion may be trained with respect to weather skills, a second portion may be trained with respect to music skills, a third portion may be trained with respect to travel skills, etc.

Clustering may not be beneficial in every instance because clustering may cause the shortlister component 410 to output indications of only a portion of the skills that the natural language input may relate to. For example, a natural language input may correspond to "tell me about Tom Collins." If the model is clustered based on skill type, the shortlister component 410 may determine the natural language input corresponds to a recipe skill (e.g., a drink recipe) even though the natural language input may also correspond to an information skill (e.g., storing or otherwise having access to information about a person named Tom Collins).

Training the shortlister component 410 (and other machine learned components described herein) may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

A machine learned component may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

If the shortlister component 410 determines a natural language input is associated with multiple skills, only the recognizers 363 associated with those skills may be called to process with respect to the natural language input. The selected recognizers 363 may process in parallel, in series, partially in parallel, etc. For example, if the shortlister component 410 determines a natural language input relates to both a communications skill and a music skill, a recognizer 363 associated with the communications skill may process in parallel, or partially in parallel, with a recognizer 363 associated with the music skill.

The shortlister component 410 may make binary (e.g., yes/no, 1/0, etc.) determinations regarding whether a skill corresponds to a natural language input. The shortlister component 410 may make such determinations using the one or more trained models described herein above. If the shortlister component 410 implements a single trained model for each skill, the shortlister component 410 may simply run the models that are associated with enabled skills as indicated in a profile (e.g., stored in a profile storage 270 described in further detail below) associated with the device 110 and/or user 5.

The shortlister component 410 may generate shortlisted skill data 415 (illustrated in FIG. 4) representing one or more skills that relate to the natural language input. The number of skills represented in the shortlisted skill data 415 is configurable. In an example, the shortlisted skill data 415 may indicate every skill of (or otherwise in communication with) the system 120 as well as represent, for each skill, whether the skill relates to the natural language input. In another example, instead of indicating every skill, the shortlisted skill data 415 may only indicate the skills that the shortlister component 410 determines relates to the natural language input. In yet another example, the shortlister component 410 may implement thresholding such that the shortlisted skill data 415 may indicate no more than a maximum number of skills that the shortlister component 410 determines relates to the natural language input.

In at least some embodiments, the shortlister component 410 may generate a score representing how likely a skill relates to a natural language input. In such embodiments, the shortlisted skill data 415 may only include identifiers of skills associated with scores satisfying a condition (e.g., meeting or exceeding a threshold score).

In the situation where the ASR component 250 outputs ASR output data including more than one ASR hypothesis, the shortlister component 410 may output different shortlisted skill data 415 for each ASR hypothesis. Alternatively, the shortlister component 410 may output a single instance of shortlisted skill data 415 that represents skills corresponding to the different ASR hypotheses.

As indicated above, the shortlister component 410 may implement thresholding such that the shortlisted skill data 415 may indicate no more than a threshold number of skills (e.g., may include no more than a threshold number of skill identifiers). If the ASR component 250 outputs ASR output data including more than one ASR hypothesis, the shortlisted skill data 415 may indicate no more than a threshold number of skills irrespective of the number of ASR hypotheses. Additionally or alternatively, the shortlisted skill data 415 may indicate no more than a threshold number of skills for each ASR hypothesis (e.g., indicating no more than five skills for a first ASR hypothesis, no more than five skills for a second ASR hypothesis, etc.).

If the shortlister component 410 implements a different trained model for each skill, the shortlister component 410 may generate a different confidence score for each skill-specific trained model that is run by the shortlister component 410. For example, if the shortlister component 410 runs the models of every skill of (or otherwise in communication with) the system 120, the shortlister component 410 may generate a respective confidence score for each skill of (or otherwise in communication with) the system 120. For further example, if the shortlister component 410 only runs models specific to skills that are indicated as enabled in a profile associated with the device 110 and/or user 5 (as stored in the profile storage 270), the shortlister component 410 may only generate a respective confidence score for each enabled skill. For further example, if the shortlister component 410 implements a single trained model with skill-specific portions, the shortlister component 410 generate a respective confidence score for each skill who's specifically trained portion is run. The shortlister component 410 may perform matrix vector modification to obtain confidence scores for skills.

An example of shortlisted skill data 415 including confidence scores may be represented as:
Search skill, 0.67
Recipe skill, 0.62
Information skill, 0.57

As indicated, the confidence scores output by the shortlister component 410 may be numeric values. The confidence scores output by the shortlister component 410 may alternatively be binned values (e.g., high, medium, low).

The shortlister component 410 may consider context data 420 when determining which skills relate to a natural language input. The context data 420 may be embedded (e.g., character embedded using art known or proprietary techniques) prior to being input to the shortlister component 410.

The context data 420 may include usage history data associated with the device 110 and/or user 5. For example, a confidence score of a skill may be increased if natural language inputs captured by the device 110 and/or originating from the user 5 routinely relate to the skill. Conversely, a confidence score of a skill may be decreased if natural language inputs captured by the device 110 and/or originated from the user 5 rarely relate to the skill.

The context data 420 may indicate the skills that are enabled with respect to the device 110 and/or user 5 (e.g., as represented in the profile storage 270). The shortlister component 410 may use such context data 420 to determine which skill-specific trained models to run. That is, the shortlister component 410 may determine to only run the trained models associated with enabled skills. The shortlister component 410 may alternatively use such context data 420 to alter skill confidence scores represented in the shortlisted skill data 415. As an example, considering two skills, one enabled and another unenabled, the shortlister component 410 may run a first model (or model portion) specific to the unenabled skill as well as a second model (or model portion) specific to the enabled skill. The shortlister component 410 may initially determine a confidence score of 0.60 for each of the skills. The shortlister component 410 may then alter those confidence scores based on which skill is enabled. For example, the shortlister component 410 may increase the confidence score associated with the enabled skill and/or decrease the confidence score associated with the unenabled skill.

The context data 420 may indicate a type of the device 110. The type of the device 110 may represent the input/output capabilities of the device 110. For example, a device type may represent the device 110 includes a display, the device 110 is headless (e.g., displayless), the device 110 is a mobile device, the device 110 is a stationary device, the device 110 includes audio playback capabilities, the device 110 includes a camera, etc. The shortlister component 410 may use such context data 420 to determine which skill-specific trained models (or portions of a model) to run. For example, if the device 110 corresponds to a displayless device type, the shortlister component 410 may determine not to run trained models (or portions of a model) specific to skills that output video data. The shortlister component 410 may alternatively use such context data 420 to alter skill confidence scores represented in the shortlisted skill data 415. As an example, considering two skills, one that outputs audio data and another that outputs video data, the shortlister component 410 may run a first model (or first portion of a model) specific to the skill that generates audio data as well as a second model (or second portion of a model) specific to the skill that generates video data. The shortlister component 410 may initially determine a confidence score of 0.60 for each of the skills. The shortlister component 410 may then alter the original confidence scores based on the type of the device 110. For example, if the device 110 corresponds to a displayless device type, the shortlister component 410 may increase the confidence score associated with the skill that generates audio data and/or decrease the confidence score associated with the skill that generates video data.

The device type, represented in the context data 420, may represent output capabilities of a device 110 to be used to output a response to the user 5, which may not necessarily be the device 110 that captured the natural language input (or other type of command). For example, a displayless device 110 may receive a natural language input corresponding to "play Game of Thrones," and the system 120 may determine a smart TV, or other device including or otherwise associated with a display, is to be used to output multimedia content (e.g., audio and video) corresponding to the title "Game of Thrones."

The context data 420 may indicate a speed of the device 110, a location of the device 110, or other mobility data. For example, the device 110 may correspond to a vehicle including a display. If the vehicle is moving, the shortlister component 410 may decrease the confidence score associated with a skill that generates video data as it may be undesirable to output video content to the user 5 while in a moving vehicle. The vehicle may be configured to periodically send, to the system 120, data indicating whether the vehicle is in motion.

The context data 420 may indicate a currently invoked skill (e.g., a skill that was being used to output content to the user 5 when the device 110 received the natural language input or other command). For example, the user 5 may speak a first natural language input causing the system 120 to invoke a music skill to output music to the user 5. As the music is being output, the system 120 may receive a second natural language input. The shortlister component 410 may use such context data 420 to alter skill confidence scores represented in the shortlisted skill data 415. For example, the shortlister component 410 may run a first model (or a first portion of model) specific to the music skill as well as a second model (or second portion of a model) specific to a second skill. The shortlister component 410 may initially determine a confidence score of 0.60 for each of the skills. The shortlister component 410 may then alter the original confidence scores based on the music skill being invoked to output content while the second natural language input was received. Based on the music skill being invoked, the shortlister component 410 may increase the confidence score associated with the music skill and/or decrease the confidence score associated with the second skill.

The thresholding implemented with respect to the shortlisted skill data 415, and the different types of context data 420 considered by the shortlister component 410, are configurable.

The shortlister component 410 may cause the NLU component 260 to execute only a subset of the recognizers 363 associated with skills represented in the shortlisted skill data 415 as relating to the natural language input. If the shortlister component 410 generates the shortlisted skill data 415 to include confidence scores, the shortlister component 410 may cause the NLU component 260 to execute only recognizers 363 associated with skills associated with confidence scores satisfying (e.g., meeting or exceeding) a condition (e.g., a threshold confidence score).

The NLU component 260 may aggregate NLU hypotheses, output by multiple recognizers 363, into cross-recognizer hypothesis data 440 (illustrated in FIG. 4). Each NLU hypothesis may be associated with a respective score indicating a likelihood that the NLU hypothesis corresponds to the domain, skill(s), etc. associated with the recognizer 363 from which the NLU hypothesis was output. For example, the cross-recognizer hypothesis data 440 may be represented as, with each line corresponding to a different NLU hypothesis:

[0.95] Intent: <PlayMusic> AlbumName: GameOfThrones

[0.70] Intent: <PlayVideo> VideoTitle: GameOfThrones. While the foregoing illustrates cross-recognizer hypothesis data 440 include two NLU hypotheses, it will be appreciated that the cross-recognizer hypothesis data 440 may include differing numbers of NLU hypotheses with departing from the present disclosure.

The NLU component 260 may send the cross-recognizer hypothesis data 440 to a pruning component 450, which sorts the NLU hypotheses according to their respective scores. The pruning component 450 may then perform score thresholding with respect to the cross-recognizer hypothesis data 440. For example, the pruning component 450 may select NLU hypotheses associated with scores satisfying (e.g., meeting and/or exceeding) a condition (e.g., a threshold score). The pruning component 450 may additionally or alternatively perform number of NLU hypothesis thresholding. For example, the pruning component 450 may select a threshold number of top-scoring NLU hypotheses represented in the cross-recognizer hypothesis data 440.

The pruning component 450 may generate cross-recognizer hypothesis data 460 including the selected NLU hypotheses. The purpose of the pruning component 550 is to create a reduced list of NLU hypotheses so that downstream, more resource intensive, processes may only operate on NLU hypotheses that most likely represent the natural language input.

The NLU component 260 may include a light slot filler component 452 that takes text data, represented in the NLU hypotheses output by the pruning component 450, and alters it to make the text data more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or "compact disc." The replaced text data is then included in the cross-recognizer hypothesis data 460.

The cross-recognizer hypothesis data 460 may be sent to an entity resolution component 470. The entity resolution component 470 can apply rules or other instructions to standardize labels or tokens in the NLU hypotheses represented in the cross-recognizer hypothesis data 460. The precise transformation may depend on the skill, domain, etc. to which a NLU hypothesis relates. For example, for a travel skill-specific NLU hypothesis, the entity resolution component 470 may transform text data corresponding to "Boston airport" to the standard "BOS" three-letter code referring to the airport. The entity resolution component 470 can refer to a knowledge base that is used to specifically identify the precise entity referred to in each slot of each NLU hypothesis represented in the cross-recognizer hypothesis data 460.

Specific intent/slot combinations may also be tied to a particular source, which may then be used to resolve the text data. Referring to the example natural language input "play songs by the stones," the entity resolution component 470 may reference a personal music catalog, user profile, or the like. The entity resolution component 470 may output NLU hypotheses, altered from the cross-recognizer hypothesis data 460, that include more detailed information (e.g., entity identifiers) about the specific entities mentioned in the slots and/or more detailed slot data that can eventually be used by a skill to perform an action responsive to the natural language input. The NLU component 260 may include multiple entity resolution components that are each specific to one or more different skills, domains, etc.

The NLU component 260 may include a ranker component 490 that assigns a particular score to each NLU hypothesis output by the entity resolution component 470. The ranker component 490 may alter the score of a particular NLU hypothesis based on whether the NLU hypothesis has unfilled slots. For example, if a first NLU hypothesis includes slots that are all filled/resolved, the ranker component 490 may assign the first NLU hypothesis a higher score than a second NLU hypothesis including at least one slot that is unfilled/unresolved by the entity resolution component 470.

The ranker component 490 may apply re-scoring, biasing, or other techniques. To do so, the ranker component 490 may consider not only the data output by the entity resolution component 470, but may also context data 491.

The context data 491 may indicate skill ratings or popularities. For example, if a skill has a high rating, the ranker component 490 may increase the score of a NLU hypothesis associated with that skill, and vice versa.

The context data 491 may indicate skills that have been enabled by the user 5. For example, the ranker component 490 may assign higher scores to NLU hypotheses associated with enabled skills than to NLU hypotheses associated with skills that have not been enabled by the user 5.

The context data 491 may indicate a system usage history (e.g., specific to the user 5), such as if the user 5 regularly invokes a particular skill or does so at particular times of day. The context data 491 may indicate a present date, a present time, a location of the device 110, weather data, a type of the device 110, user preferences, as well as other context data. For example, the ranker component 490 may consider when any particular skill is currently active with respect to the present user 5 and/or device 110 (e.g., music being output by the skill when the current natural language input is received).

The ranker component 490 may output NLU output data 585 including one or more NLU hypotheses. The NLU component 260 may send the NLU output data 285 to the orchestrator component 230.

As described above, the system 120 may perform speech processing using two different components (e.g., the ASR component 250 and the NLU component 260). In at least some embodiments, the system 120 may implement a spoken language understanding (SLU) component configured to process audio data 211 to generate NLU output data 485.

The SLU component may be equivalent to a combination of the ASR component 250 and the NLU component 260. Yet, the SLU component may process audio data 211 and directly generate the NLU output data 485, without an intermediate step of generating ASR output data. As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. The SLU component may output a most likely NLU hypothesis, or multiple NLU hypotheses associated with respective confidence or other scores (such as probability scores, etc.).

Figure 5:
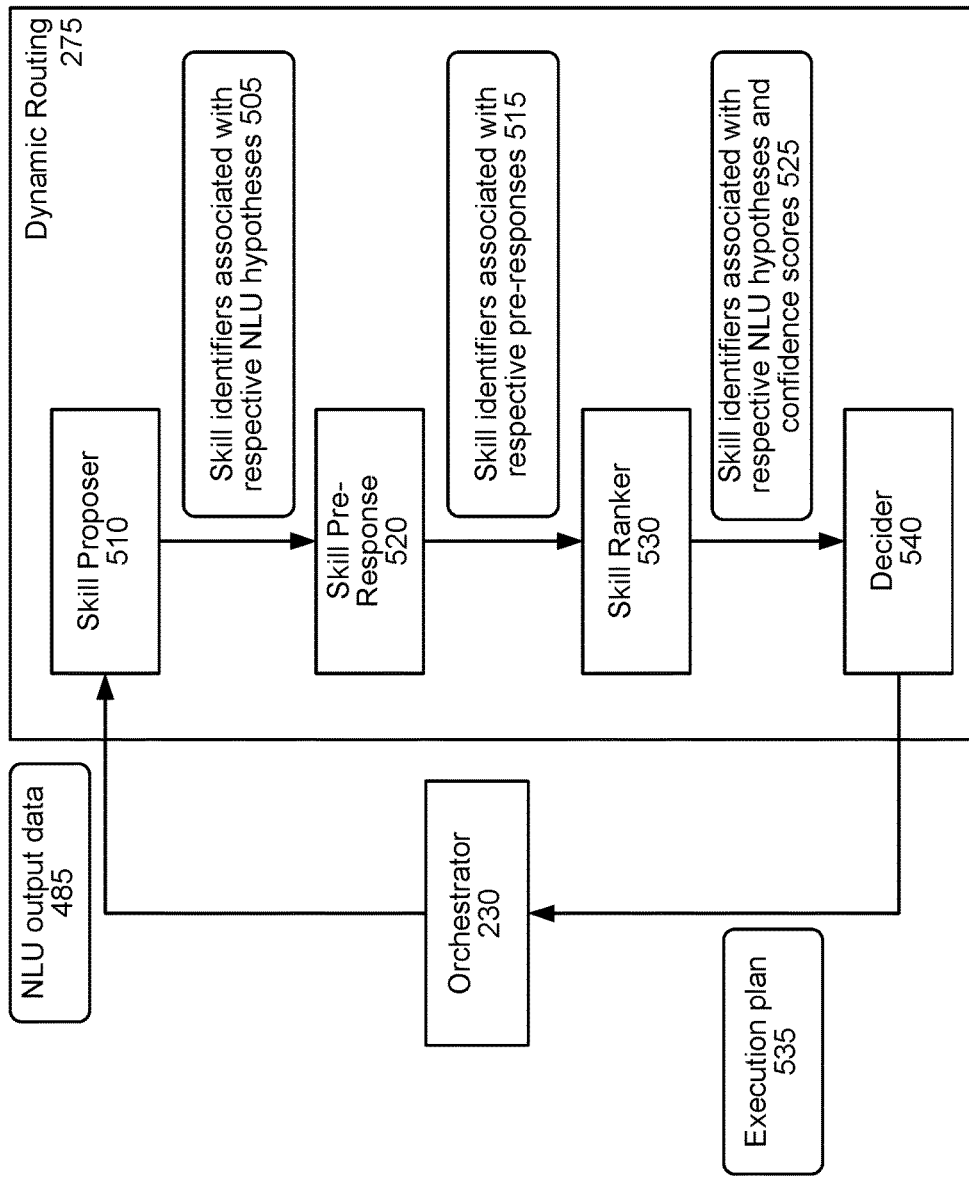
FIG. 5 is a conceptual diagram illustrating how the system may select a skill to respond to a command at runtime, according to embodiments of the present disclosure.

The system 120 may include a dynamic routing component 275 (illustrated in FIGS. 2 and 5). The dynamic routing component 275 may determine which NLU hypothesis most accurately represents the natural language input, as well as determine which skill is to execute in response to the natural language input.

As illustrated in FIG. 5, the dynamic routing component 275 may include a skill proposer 510 configured to determine skills capable of processing in response to the natural language input. The skill proposer 510 may receive NLU output data 485 representing the natural language input. The skill proposer 510 may also receive context data corresponding to the natural language input. For example, the context data may indicate (1) a skill that was causing the device 110 to output content (e.g., music, video, synthesized speech, etc.) when the device 110 captured the natural language input, (2) one or more skills that are indicated as enabled in a profile (as stored in the profile storage 270) associated with the user 5, (3) output capabilities (which may be represented as a device type identifier) of a device (which may or may not be the same device as the device 110 that captured the natural language input) to be used to output a response to the natural language input, (4) a geographic location of the device 110 (e.g., as represented in a profile in the profile storage 270), (5) an operation mode of the device to be used to output a response to the natural language input (e.g., data indicating whether the device presently corresponds to a "do not disturb" status, whether the device is enabled to be used for 1-way messaging functionality of the system 120, whether the device is enabled to be used for 2-way communication functionality of the system 120, whether the device is enabled to output announcement content, etc.), (6) ASR output data, (7) various user preferences, user profile data, and/or other context data available to the system 120 and corresponding to the natural language input.

The skill proposer 510 may determine skill proposal rules. A skill developer (via a skill developer device) may provide the system 120 with rules data, corresponding to one or more rules, representing when the skill developer's skill should be called to execute. In at least some embodiments, such a rule may be specific to an NLU intent. In such embodiments, if a skill system 125 is configured to execute with respect to multiple intents, the skill may be associated with more than one rule (e.g., each rule corresponding to a different intent capable of being handled by the skill). In addition to being specific to an intent, a rule may indicate one or more entities identifiable by an NER component 362, one or more entity identifiers capable of being output by the entity resolution component 470, and/or context to which a natural language input may correspond. For example, a rule may indicate output capabilities of a device, a geographic location, an operation mode of a device (e.g., that a device needs to be enabled to be used for 1-way messaging functionality of the system 120, that a device needs to be enabled to be used for 2-way communication functionality of the system 120, that a device needs to be enabled to output announcement content, etc.), and/or other context data. The system 120 may associate a skill's identifier with each rule corresponding to the skill. As an example, the system 120 may store rule data indicating a video skill may execute when a natural language input corresponds to a <PlayVideo> intent and the device (to be used to output a response to the natural language input) includes (or is otherwise associated with) a display. As another example, the system 120 may store rule data indicating a music skill may execute when a natural language input corresponds to a <PlayMusic> intent and music is being output by a device when the device captures a natural language input. It will be appreciated that other examples are possible. The foregoing rules enable skills to be selectively proposed at runtime (e.g., based on NLU entities, NLU entity resolution identifiers, and context data) in systems where multiple skills are configured to execute with respect to a same NLU intent.

The skill proposer 510 may, using the received context data and the foregoing described skill proposal rules, generate data 505 representing skills configured to process in response to the natural language input. Thus, in at least some embodiments, the skill proposer 510 may be implemented as a rules engine. In at least some embodiments, the skill proposer 510 may make binary (e.g., yes/no, true/false, etc.) determinations regarding whether a skill is configured to process in response to the natural language input. For example, the skill proposer 510 may determine a skill is configured to process, in response to the natural language input, if the skill is associated with a rule corresponding to the NLU output data 485 (e.g., corresponding to an intent (and optionally one or more entities and/or entity resolution identifiers) represented in the received NLU output data 485) and the received context data.

In at least some embodiments, the skill proposer 510 may generate data 505 representing such binary determinations made with respect to all skills implemented by (or otherwise in communication with) the system 120. In at least some embodiments, the skill proposer 510 may generate data 510 representing such binary determinations made with respect to only a portion of the skills implemented by (or otherwise in communication with) the system 120 (for example only skills indicated as enabled in the received context data).

The skill proposer 510 may output data 505 including skill identifiers and associated NLU output data. For example, each skill identifier, in the data 505, may be associated with one or more NLU hypotheses (represented in the NLU output data 485). The skill proposer 510 may simply make binary determinations (as described above); as such, the skill proposer 510 may not make any confidence determinations, and the skill identifiers may not be associated with confidence values in the data 505. An illustrative example of the data 505, that may be output by the skill proposer 510, may be represented as:

Skill Identifier: 1ds532 Intent: <PlayMusic> AlbumName: GameOfThrones
Skill Identifier: jfdlk828 Intent: <PlayVideo> VideoTitle: GameOfThrones
Skill Identifier: 434k1113 Intent: <PlayVideo> VideoTitle: GameOfThrones with the "Intent: <PlayMusic> Album Name: GameofThrones" and "Intent: <PlayVideo> VideoTitle: GameofThrones" portions of the data 505 corresponding to NLU output data.

In at least some embodiments, the shortlister component 410 (of the NLU component 260) and the skill proposer 510 may both be implemented by the system 120. In such instances, the shortlister component 410 and the skill proposer 510 may process with respect to different skills. For example, in at least some embodiments, the shortlister component 410 may process with respect to skill systems 125 in communication with the system 120 (e.g., illustrated in FIG. 2 as being outside of the system 120), and the skill proposer 510 may process with respect to skill components 290 implemented by the system 120 (e.g., illustrated in FIG. 2 as a component box within the system 120). In such embodiments, skill identifiers output by the shortlister component 410 (and associated NLU output data) may be merged with the skill identifiers and associated NLU output data (output by the skill component proposer 510), and the merged data may be input to a skill pre-response component 520 of the dynamic routing component 275. Alternatively, the skill identifiers and associated NLU output data (output by the shortlister component 410), and the skill identifiers and associated NLU output data (output by the skill proposer 510) may be separately sent to the skill pre-response component 520.

The data 505, output by the skill proposer 510, may be received by a skill pre-response component 520 of the dynamic routing component 275 (either directly or indirectly from the skill proposer 510). The skill pre-response component 520 may be configured to query skills for pre-responses. A pre-response may represent how a skill may process if called to respond to the natural language input, and may optionally include a variety of other data representing a strength of the skill's response. For example, a pre-response may indicate a skill can personalize a response using profile data accessible to the skill (and may indicate the types of profile data accessible); a pre-response may indicate a skill can respond but cannot personalize the response; a pre-response may indicate a user does not have a subscription with the skill, but that the skill can respond using free functionality of the skill; etc.

The skill pre-response component 520 may send a pre-response query to each skill associated with a skill identifier output by the skill proposer 520. The skill pre-response component 520 may determine, in the received data 505, a portion of NLU output data associated with a particular skill identifier. Thereafter, the skill pre-response component 520 may send, to a skill corresponding to the skill identifier, a pre-response query including the portion of the NLU output data associated with the skill's identifier.

A skill may determine, based on received NLU output data and other data available to the skill, whether the skill is able to respond to the natural language input. For example, a skill may generate a pre-response indicating the skill can respond to the natural language input, indicating the skill may be able to respond to the natural language input (e.g., the indicating the skill needs more data to determine whether the skill can respond to the natural language input), or indicating the skill cannot respond to the natural language input (e.g., due to the skill experiencing a high processing load).

In situations where a skill's pre-response indicates the skill can or may be able to respond to the natural language input, the pre-response may also include various other data representing a strength of the skill's potential response to the natural language input. For example, such other data may indicate capabilities (e.g., output capabilities or components such as availability of a connected screen, loudspeaker, etc.) of a device to be used to output the skill's response; pricing data corresponding to a product or service the natural language input is requesting be purchased (or is requesting purchase data for); availability of a product the natural language input is requesting be purchased; whether there are shipping fees for a product the natural language input is requesting be purchased; whether the user 5 already has a profile and/or subscription with the skill; that the user 5 does not have a subscription with the skill, but that there is a free trial/tier the skill is offering; with respect to a taxi skill, a cost of a trip based on start and end locations, how long the user 5 would have to wait to be picked up, etc.; and/or other data available to the skill that is related to the skill's processing of the natural language input. In at least some embodiments, a skill's pre-response may include a flag (or other indicator) representing a strength of the skill's ability to personalize its response to the user 5.

In at least some embodiments, a skill's pre-response may be configured to a schema pre-defined by the system 120. By the system 120 requiring pre-responses to conform to a specific schema (e.g., by requiring skills to only be able to provide certain types of data in pre-responses), the system 120 may onboard new skills into the dynamic routing functionality described herein without needing to reconfigure the dynamic routing component 275 each time a new skill is onboarded. Moreover, requiring pre-responses to conform to a schema limits the amount of values needed to be used to train and implement a machine learned model for ranking skills at runtime, as described herein below.

The skill pre-response component 520 may receive pre-response data from the queried skills. The skill pre-response component 520 may determine a portion of the received pre-response data corresponding to skills capable of responding to the natural language input. In other words, the skill pre-response component 520 may determine a portion of received pre-responses indicating the associated skill(s) can respond to the natural language input, or may be able to respond if the skill gets more data.

Thereafter, the skill pre-response component 520 may output data 515 including skill identifiers and associated pre-response. This data 515 may not include skill identifiers, and associated pre-responses, corresponding to skills that indicated they could not respond to the natural language input. Thus, a skill's pre-response, which indicates the skill cannot respond to the natural language input, may effectively operate as a way for the skill to prevent itself from being invoked at runtime to respond to the natural language input.

The data 515, output by the skill pre-response component 520, may be received by a skill ranker 530 of the dynamic routing component 275 (either directly or indirectly from the skill pre-response component 520). The skill ranker 530 may be configured to rank skills using a machine learned model. In at least some embodiments, the machine learned model may be built on a deep neural network (DNN).

At runtime the skill ranker 530 may receive the data 515 including skill identifiers and associated pre-responses. The skill ranker 530 may also receive context data corresponding to the natural language input. Such context data may indicate, for example, one or more user preferences of the user 5 (as represented in a user profile or group profile stored in the profile storage 270), one or more domains corresponding to the natural language input, one or more intents representing the natural language input, NER slot values as represented in the NLU output data 485, a measure of success of entity resolution performed with respect to the natural language input, text representing the natural language input, rankings of individual NLU hypotheses in the NLU output data 485, a type of the device 110 that received the natural language input, a type of the device 110 that is to be used to output a response to the natural language input, whether the device 110 (that received the natural language input) was outputting audio when the natural language input was received, whether the device 110 (that received the natural language input) was outputting video when the natural language input was received, and/or other context data available to the system 120.

Using a machine learned model, the skill ranker 530 may process the skill pre-responses and the context data to generate confidence scores for skills represented in the data 515 output by the skill pre-response component 520. Things that may increase a skill's ranking include, for example, that the skill is associated with a pre-response indicating the skill can generate a response (to the natural language input) that is personalized to the user 5, that an NLU hypothesis corresponding to the skill is ranked highly in the NLU hypotheses output by the NLU component 260, that the skill corresponds to a music skill and the device 110 was outputting music when the natural language input was received, that the skill corresponds to a video skill and the device 110 was outputting video when the natural language input was received, etc. Things that may decrease a skill's ranking include, for example, that the skill is associated with a pre-response indicating the skill cannot generate a response (to the natural language input) that is personalized to the user 5, that an NLU hypothesis corresponding to the skill is ranked low in the NLU hypotheses output by the NLU component 260, that the skill corresponds to a video skill and the device 110 was outputting music when the natural language input was received, that the skill corresponds to a music skill and the device 110 was outputting video when the natural language input was received, etc. Other examples are possible and will depend on the context data available to the skill ranker 530.

The skill ranker 530 may output data 525 including skill identifiers associated with respective NLU hypotheses and confidence scores. In at least some embodiments, the skill ranker 530's processing may affect scores (e.g., confidence scores) associated with the skill component identifiers, but not affect scores (e.g., confidence scores) generated by the NLU component 260. An illustrative example of the data 525, that may be output by the skill ranker 530, may be represented as:

- [0.85] Skill Identifier: 12dfrads532 Intent: <PlayMusic> AlbumName: GameOfThrones
- [0.62] Skill Identifier: jfd1k828 Intent: <PlayVideo> VideoTitle: GameOfThrones
- [0.55] Skill Identifier: 434k1113 Intent: <PlayVideo> VideoTitle: GameOfThrones with the "Intent: <PlayMusic> Album Name: GameofThrones" and "Intent: <PlayVideo> VideoTitle: GameofThrones" portions of the data 525 corresponding to NLU hypotheses.

A decider component 540 (of the dynamic routing component 275) may receive the data 525 from the skill ranker 530 (either directly or indirectly). The decider component 540 is configured to generate an execution plan 535 based on the data 525. For example, an execution plan 535 may include the top ranked skill identifier and associated NLU hypothesis represented in the data 525, along with an instruction to invoke the skill (corresponding to the top-ranked skill identifier) to respond to the natural language input. In response to receiving such an execution plan 535, the orchestrator component 230 may invoke the skill (corresponding to the top-ranked skill identifier) by sending the NLU hypothesis to the skill along with an instruction to generate a response. For further example, an execution plan 535 may indicate further data is needed from the user 5 in order for the dynamic routing component 275 to adequately determine which skill should be invoked. In response to receiving such an execution plan 535, the orchestrator component 230 may engage the user 5 to gather the further needed data (e.g., by causing the device 110 to output synthesized speech and/or visual content requesting the further data, and the device 110 capturing one or more further natural language inputs corresponding to the further needed data). It will be appreciated that the foregoing are merely illustrative execution plans 535 and subsequent processing, and that the decider 540 may output other execution plans 535 causing other processing without departing from the present disclosure.

Referring again to FIG. 2, the system 120 may include one or more skill components 290 and/or may communicate with one or more skill systems 125 via one or more skill components 290. A skill component 290, skill system 125, and a combination of a skill component 290 and skill system 125 may be referred to herein as a "skill." A skill may be configured to execute with respect to NLU output data 485. For example, for an NLU hypothesis including a <GetWeather> intent, the system 120 (and more particularly the orchestrator component 230) may invoke a weather skill to determine and output weather information for a geographic location represented in a user profile or corresponding to a location of the device 110 that captured the corresponding natural language input. For further example, for an NLU hypothesis including a <BookRide> intent, the system 120 (and more particularly the orchestrator component 230) may invoke a taxi skill to book a requested ride. In another example, for an NLU hypothesis including a <BuyPizza> intent, the system 120 (and more particularly the orchestrator component 230) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 280 that generates audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, retina data, etc.), received by the system 120 in correlation with a natural language input, to stored biometric data of users. The user recognition component 295 may additionally or alternatively perform user recognition by comparing image data (e.g., including a representation of at least a feature of a user), received by the system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition processing.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data. Data of a profile may additionally or alternatively include data representing a preferred assistant to respond to natural language inputs corresponding to the profile.

The profile storage 270 may include one or more user profiles. Each user profile may be associated with a different user identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language inputs. If a user does not enable a skill, the system 120 may not invoke the skill to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying data. A device profile may also include one or more user identifiers, corresponding to one or more user profiles associated with the device profile. For example, a household device's profile may include the user identifiers of users of the household.

Figure 6:
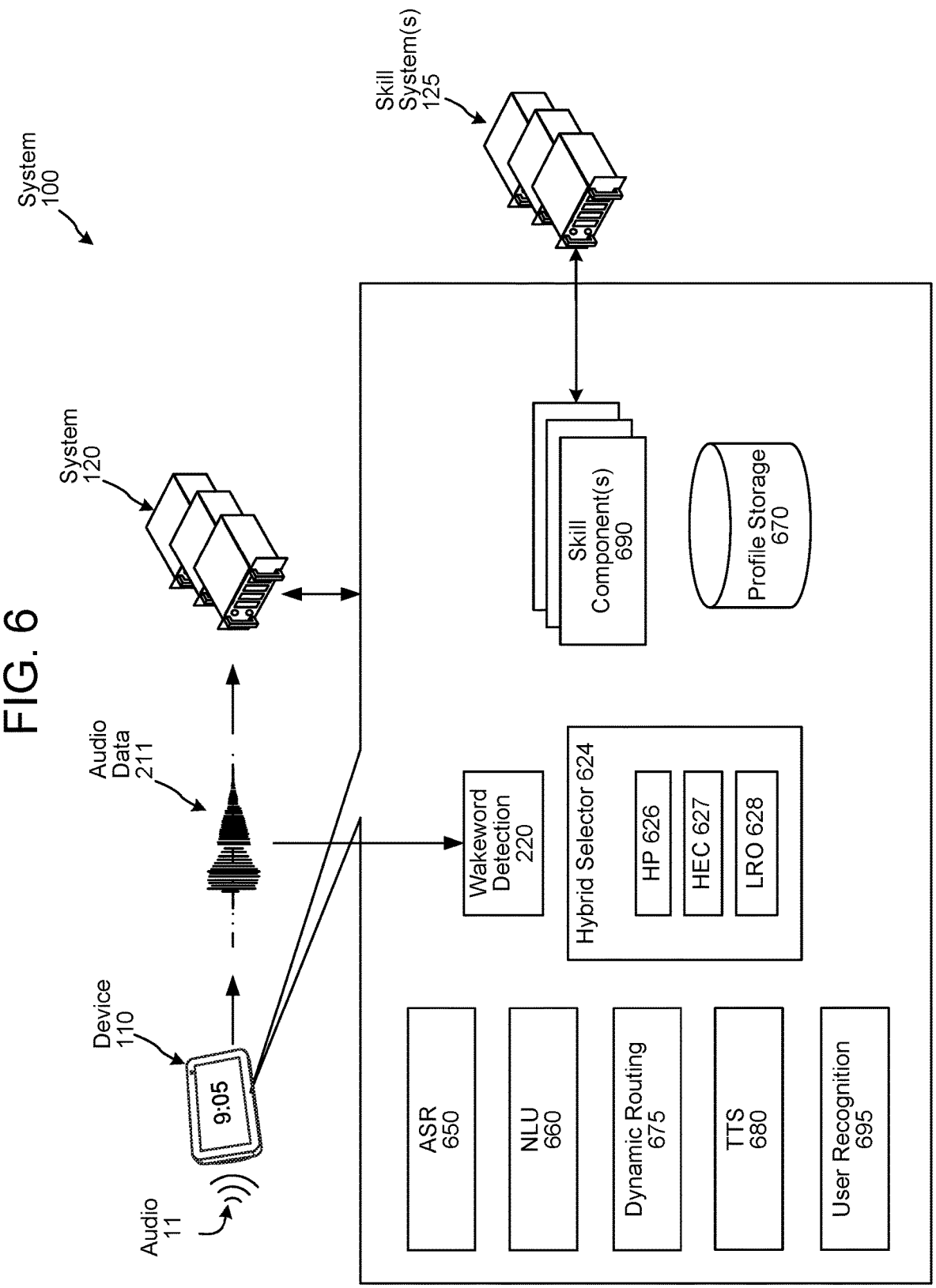
FIG. 6 is a conceptual diagram illustrating components that may be included in a device, according to embodiments of the present disclosure.

The foregoing describes illustrative components and processing of the system 120. In at least some embodiments, the device 110 may be configured to include some or all of the components, and perform some or all of the processing, of the system 120 described above. FIG. 6 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 680) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a nearby device (e.g., a directive to turn on a smart light). It is to be appreciated that the system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

As noted with respect to FIG. 2, the device 110 may include a wakeword detection component XA20 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 624, of the device 110, may send the audio data 211 to the wakeword detection component 220. If the wakeword detection component 220 detects a wakeword in the audio data 211, the wakeword detection component 220 may send an indication of such detection to the hybrid selector 624. In response to receiving the indication, the hybrid selector 624 may send the audio data 211 to the system 120 and/or the ASR component 650. The wakeword detection component 220 may also send an indication, to the hybrid selector 624, representing a wakeword was not detected. In response to receiving such an indication, the hybrid selector 624 may refrain from sending the audio data 211 to the system 120, and may prevent the ASR component 650 from further processing the audio data 211. In this situation, the audio data 211 can be discarded.

The device 110 may conduct its own speech processing using on-device language processing components, such as an ASR component 650 and an NLU 660, similar to the manner discussed above with respect to the ASR component 250 and the NLU component 660 of the system 120. The device 110 may also internally include, or otherwise have access to, other components such as one or more skill components 690 capable of executing commands based on NLU output data or other results determined by the device 110/system 120, a user recognition component 695 (configured to process in a similar manner to that discussed above with respect to the user recognition component 295 of the system 120), profile storage 670 (configured to store similar profile data to that discussed above with respect to the profile storage 270 of the system 120), or other components. In at least some embodiments, the profile storage 670 may only store profile data for a user or group of users specifically associated with the device 110. Similar to as described above with respect to FIG. 2, a skill component 690 may communicate with a skill system(s) 125.

In at least some embodiments, the on-device language processing components may not have the same capabilities as the language processing components of the system 120. For example, the on-device language processing components may be configured to handle only a subset of the natural language inputs that may be handled by the system 120. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the language processing results generated by the device 110 may indicate a low confidence or other metric indicating that the processing by the device 110 may not be as accurate as the processing done by the system 120.

The hybrid selector 624, of the device 110, may include a hybrid proxy (HP) 626 configured to proxy traffic to/from the system 120. For example, the HP 626 may be configured to send messages to/from a hybrid execution controller (HEC) 627 of the hybrid selector 624. For example, command/directive data received from the system 120 can be sent to the HEC 627 using the HP 626. The HP 626 may also be configured to allow the audio data 211 to pass to the system 120 while also receiving (e.g., intercepting) this audio data 211 and sending the audio data 211 to the HEC 627.

In at least some embodiments, the hybrid selector 624 may further include a local request orchestrator (LRO) 628 configured to notify the ASR component 650 about the availability of new audio data 211 that represents user speech, and to otherwise initiate the operations of local language processing when new audio data 211 becomes available. In general, the hybrid selector 624 may control execution of local language processing, such as by sending "execute" and "terminate" events/instructions. An "execute" event may instruct a component to continue any suspended execution (e.g., by instructing the component to execute on a previously-determined intent in order to generate a directive). Meanwhile, a "terminate" event may instruct a component to terminate further execution, such as when the device 110 receives directive data from the system 120 and chooses to use that remotely-generated directive data.

Thus, when the audio data 211 is received by the voice services component 622, the HP 626 may allow the audio data 211 to pass through to the system 120 and the HP 626 may also input the audio data 211 to the on-device ASR component 650 by routing the audio data 211 through the HEC 627 of the hybrid selector 624, whereby the LRO 628 notifies the ASR component 650 of the audio data 211. At this point, the hybrid selector 624 may wait for response data from either or both of the system 120 or the local language processing components. However, the disclosure is not limited thereto, and in some examples the hybrid selector 624 may send the audio data 211 only to the local ASR component 650 without departing from the disclosure. For example, the device 110 may process the audio data 211 locally without sending the audio data 211 to the system 120.

The local ASR component 650 is configured to receive the audio data 211 from the hybrid selector 624, and to recognize speech in the audio data 211, and the local NLU component 660 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data that is generated by the local language processing component 640 (and/or the system 120) may be formatted using Java, such as JavaScript syntax, or JavaScript-based syntax. This may include formatting the directive using JSON. In at least some embodiments, a device-generated directive may be serialized, much like how remotely-generated directives may be serialized for transmission in data packets over the network(s) 199. In at least some embodiments, a device-generated directive may be formatted as a programmatic API call with a same logical operation as a remotely-generated directive. In other words, a device-generated directive may mimic a remotely-generated directive by using a same, or a similar, format as the remotely-generated directive.

An NLU hypothesis (output by the NLU component 660) may be selected as usable to respond to a natural language input, and local response data may be sent (e.g., local NLU output data, local knowledge base information, internet search results, and/or local directive data) to the hybrid selector 624, such as a "ReadyToExecute" response. The hybrid selector 624 may then determine whether to use directive data from the on-device components to respond to the natural language input, to use directive data received from the system 120, assuming a remote response is even received (e.g., when the device 110 is able to access the system 120 over the network(s) 199), or to generate output audio requesting additional information from the user 5.

The device 110 and/or the system 120 may associate a unique identifier with each natural language input. The device 110 may include the unique identifier when sending the audio data 211 to the system 120, and the response data from the system 120 may include the unique identifier to identify which natural language input the response data corresponds.

In at least some embodiments, the device 110 may include, or be configured to use, one or more skill components 690 that may work similarly to the skill component(s) 290 implemented by the system 120. The skill component(s) 690 may correspond to one or more domains that are used in order to determine how to act on a spoken input in a particular way, such as by outputting a directive that corresponds to the determined intent, and which can be processed to implement the desired operation. The skill component(s)

690 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 690, a skill system 125, or a combination of a skill component 690 and a corresponding skill system 125.

Figure 7:
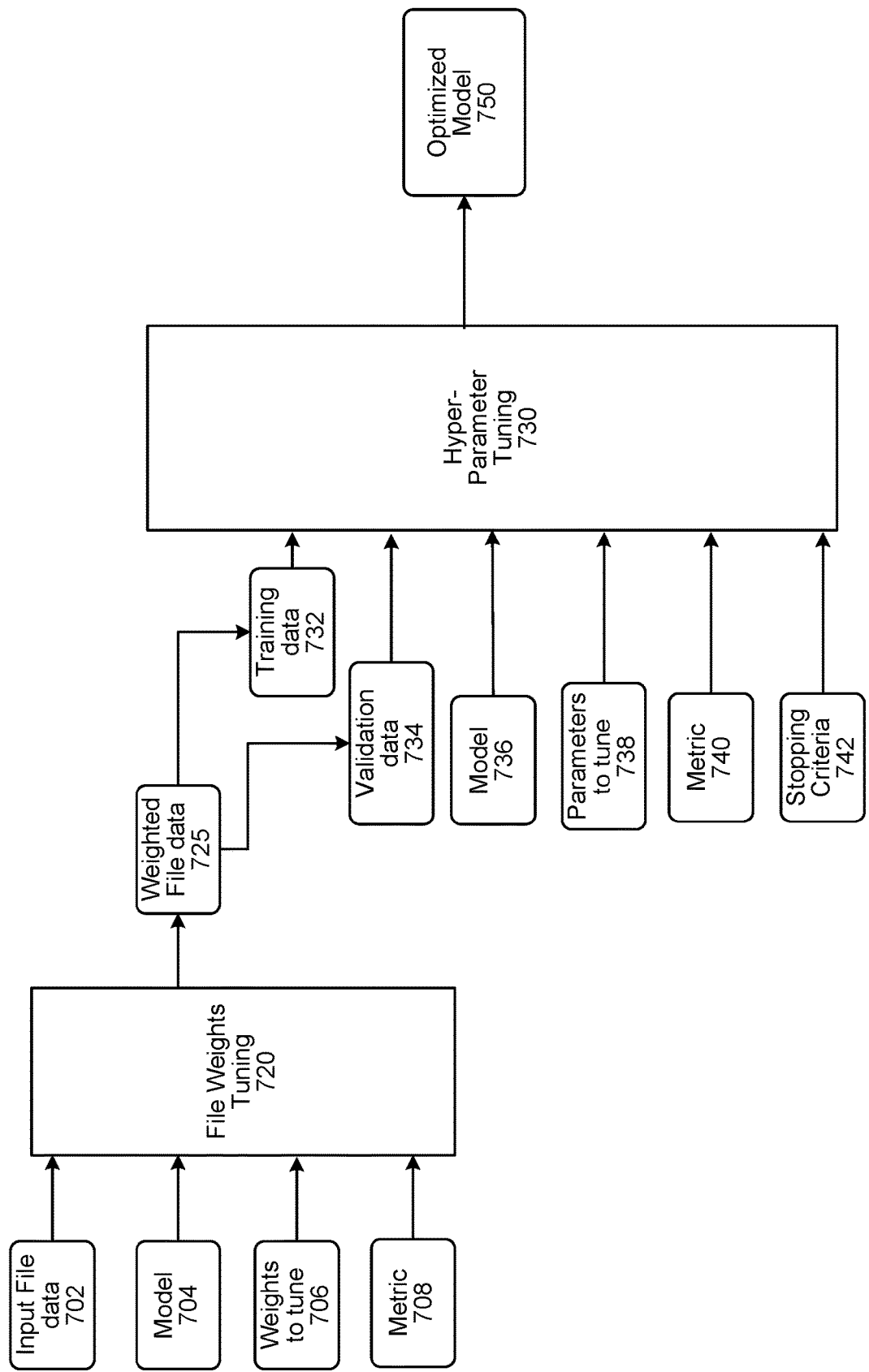
FIG. 7 is a conceptual diagram illustrating a system for tuning file weights and tuning parameters for machine learning models, according to embodiments of the present disclosure.

FIG. 7 is a conceptual diagram illustrating a system for tuning file weights and tuning parameters for ML models, according to embodiments of the present disclosure. In some embodiments, the system may tune parameters during a data preparation stage (also referred to herein as file weights tuning), and then after may tune parameters during a model building stage (also referred to herein as hyper-parameter tuning). That is, the system may execute the file weights tuning component 720 to determine weighted file data 725, then execute the hyper-parameter tuning component (HPT) 730 to determine an optimized model 750.

In some embodiments, the system may tune parameters for an ML model without determining file weights. That is, the system may execute the HPT component 730 to determine an optimized model 750, and weighted file data 725 inputted to the HPT component 730 may be defined/provided by a user (e.g., a system developer or system administrator) rather than the file weights tuning component 720. In some embodiments, the file weights tuning component 720 and the HPT component 730 are included in the remote system 115. In other embodiments, the file weights tuning component 720, the HPT component 730 or both components may be included in the NLP system 120. In other embodiments, the file weights tuning component 720, the HPT component 730 or both components may be included in the device 110. In yet another embodiment, one or more components shown in FIG. 7 may be distributed across multiple systems and devices, that is, some components may be included in the remote system 115, other components may be included in the NLP system 120, and other components may be included in the device 110.

The HPT component 730 may be a model agnostic tuning component, in that, the component 730 is capable of tuning parameters for different types of models. For example, the HPT component 730 may be able to tune parameters for various NLP system models, such as the ones described above, including but not limited to IC models (e.g., 364), domain classification models (e.g., 363), and NER models (e.g., 362).

In some embodiments, the file weights tuning component 720 and/or the HPT component 730 may be invoked using API calls during a process of updating, training, retraining or otherwise configuring various NLP models or models configured to perform other tasks.

The HPT component 730 is configured to determine a parameter configuration that will optimize a metric or loss associated with a given model. The HPT component 730 performs an efficient and automatic exploration of a parameter search space until an optimal configuration is found. To achieve this, the HPT component 730 may first execute a search strategy to adaptively identify parameter configurations in the search space to evaluate. This strategy balances between exploring uncertain regions/values in the search space and exploiting promising regions/values in the search space. In some embodiments, for searching parameter configurations for testing, the HPT component 730 may employ a Bayesian optimization search strategy. The HPT component 730, in some embodiments, may include a scheduler that enables parallel evaluations of selected parameter configurations. The scheduler may consider a stopping criterion (or criteria) for triggering when to cease evaluating parameter configurations. In some embodiments, the scheduler may employ an asynchronous hyperband scheduler. In some embodiments, the scheduler may employ a maximum concurrent worker scheduling technique.

The file weights tuning component 720 is configured to determine a weight configuration that will optimize performance of the model. The file weights tuning component 720 receives input file data 702 that may represent a set of inputs that the model 704 (the model of interest or being presently evaluated) is to be configured to process successfully. In at least some embodiments, the input file data 702 may include natural language inputs that the model is to process successfully. Like the HPT component 730, the file weights tuning component 720 may employ a search strategy for identifying weight configurations to evaluate with respect to file data. The file weights tuning component 720 may also include a scheduler to enable parallel evaluations of selected weight configurations. The scheduler may consider a stopping criterion (or criteria) for triggering when to cease evaluation of weight configurations.

The HPT component 730 may take as input parameters related to the model being evaluated by the system, such as the model (represented by model data 736) to be tuned, the list of parameters to tune (738), and the metric (740) to track.

During initialization, the HPT component 730 may generate a set of parameter configurations/values based on a criteria, for example, a random sampling of the search space of the parameter configurations. The scheduler may spin up workers to evaluate the chosen parameter configurations by training a model, that is determined using the chosen parameter configuration, using the training data 732, and computing a performance/evaluation metric corresponding to the trained model using the validation data 734. The scheduler may cease evaluation by the HPT component 730 (e.g., early stopping) if the chosen parameter configuration is deemed non-optimal (e.g., results in model weight divergence, results in a deterioration of a metric associated with the model, results in a decrease in accuracy/efficiency as compared to the initial model, etc.). When a computing resource/worker becomes free/available, the scheduler either continues with a previously selected parameter configuration (if it was among the top n trials) or selects a new parameter configuration (from the set of configurations determined using the search algorithm) to evaluate. Then the scheduler invokes training and evaluation of a model using the selected parameter configuration. The HPT component 730 continues this process until one of the stopping criteria (742) is met. The stopping criteria 742 may indicate a maximum resource budget in terms of computational time or computational resources used, a maximum number of trials to run (e.g., number of different parameter configurations to test), and/or an upper limit on the metric's improvement (e.g., a delta amount/value between the current metric (740) associated with the model 736 and the metric associated with evaluated model configurations).

The weighted file data 725 may be spilt to generate the training dataset 732 and the validation dataset 734. In some embodiments, a first portion of the weighted file data 725 may be randomly selected to be the training dataset 732 and a second portion of the weighted file data 725 may be randomly selected to be the validation dataset 734. The first and second portion may be different. In other embodiments, the first and second portion may have overlapping data. Each iteration of parameter tuning may train the ML model 736 using the training dataset 732 and then evaluate the trained ML model using the validation dataset 734.

In some embodiments, the training dataset 732 and the validation dataset 734 may be determined using a k-fold spilt of the weighted file data 725. The training dataset 732 may include k−1 data splits of the weighted file data 725, and the validation dataset 734 may include the remaining data splits. Each iteration of parameter tuning may train the ML model 736 using k−1 data splits of the weighted file data 725, and evaluate the trained ML model using the remaining data splits.

The model data 736 may represent model data, such as parameters, weights, model architecture, and other model configurations, corresponding to the model that is to be evaluated by the HPT component 730. In some embodiments, the model data 736 may indicate a name of the model (e.g., IC model). In some embodiments, the model data 736 may indicate a location where the model data is stored (e.g., a file/folder or database location) from which the HPT component 730 can access the model information.

The parameters to tune data 738 may indicate one or more parameters associated with the model data 736 that are to be tuned/optimized. The parameters to tune data 738 may also include the bounds of the parameters, that is, the maximum and minimum values for the parameter to be tested or the range of values to be tested for the parameter. The parameters to tune data 738 may also include the type of value the parameter can be, for example, a discrete value, a continuous value, an integer, a float, etc. In some embodiments, the parameters to tune data 738 may indicate one or more parameter names, for example, a "learning rate" parameter. In some embodiments, the parameters to tune data 738 may be a vector representing various information related to a parameter for tuning. Example parameters to tune data 738 may include a first vector: {parameter name: learning rate; bounds: [0.0001, 0.1]; value: float; type: continuous}, a second vector: {parameter name: number of layers; bounds [1, 10]; value: integer; type: discrete}, etc. Example parameters that may be tuned by the HPT component 730 include, but are not limited to, learning rate, batch size, number of layers, number of neurons, number of epochs, number of hidden layers, kernel size, dropout rate, etc.

The metric data 740 may indicate a performance metric to be improved with respect to model processing. The performance metric may relate to a processing accuracy of the model (i.e. the number of times/percentage that the model accurately processes an input (predicts an output)). The performance metric may relate to a processing efficiency of the model (i.e. how long the model takes to process an input). The performance metric may relate to a loss corresponding to the model. The metric data 740 may also indicate whether the performance metric is to be minimized or maximized, for example, in relation to a loss metric. In some embodiments, the metric data 740 may represent a name of the performance metric, such as, a semantic error rate (semER), intent classification error rate (ICER), domain classification error rate (DCER), etc. In some embodiments, the metric data 740 may be a perplexity metric that measures how well a probability distribution or probability model predicts a sample. It may be used to compare probability models. A low perplexity indicates the probability distribution is good at predicting the sample.

The stopping criteria data 742 may indicate one or more criterion/conditions that when met/satisfied indicates to the HPT component 730 to cease evaluation/processing. Without a stopping criteria, the HPT component 730 may, in some embodiments, continue processing until the most optimized model configuration is determined. The stopping criteria data 742 may relate to a maximum number of trials the HPT component 730 is to perform (i.e. the number of parameter values to evaluate, the number of different model configurations to evaluate, etc.). The stopping criteria data 742 may relate to an amount of time the HPT component 730 is to spend evaluating different parameter values (for example, 4 hours, 8 hours, 24 hours, etc.). The stopping criteria data 742 may relate to an amount of improvement to be achieved/realized with respect to the performance metric represented by the metric data 740.

In some embodiments, the HPT component 730 may determine which parameters to tune based on the metric data 740 indicating which performance metric is to be improved. For example, if the inputs to the HPT component 730 indicate that the semER metric is to be improved for an IC model, then the HPT component 730 may determine which parameters to tune (e.g., learning rate, number of layers, batch size, number of neurons, etc.), test different parameter configurations (different combinations of parameter values), and determine an optimized IC model where the semER metric is improved.

The optimized model data 750 may include parameters, weights, architecture, and other model configuration data corresponding to the model that the HPT component 730 determines as being the most optimized model. The optimized model may have better performance metric(s) compared to the input model data 736. The optimized model data 750 may also include selected parameter data indicating which values/configurations are selected by the HPT component 730 that results in the optimized model data 750. The optimized model data 750 may be used during runtime to evaluate incoming user inputs. For example, an optimized model data 750 for an IC model of the NLP system described above may be used to process natural language user inputs provided to the NLP system.

The system described herein is able to create a number of parameter combinations for testing different model configurations, and launch testing using the model configurations. The system may also be able to identify model configurations that are likely to result in inferior or less optimal models, and may cease further processing (e.g., training or evaluation) with respect to such models. In some cases, certain parameter values may result in weight divergence indicating a non-optimal model.

Figure 10:
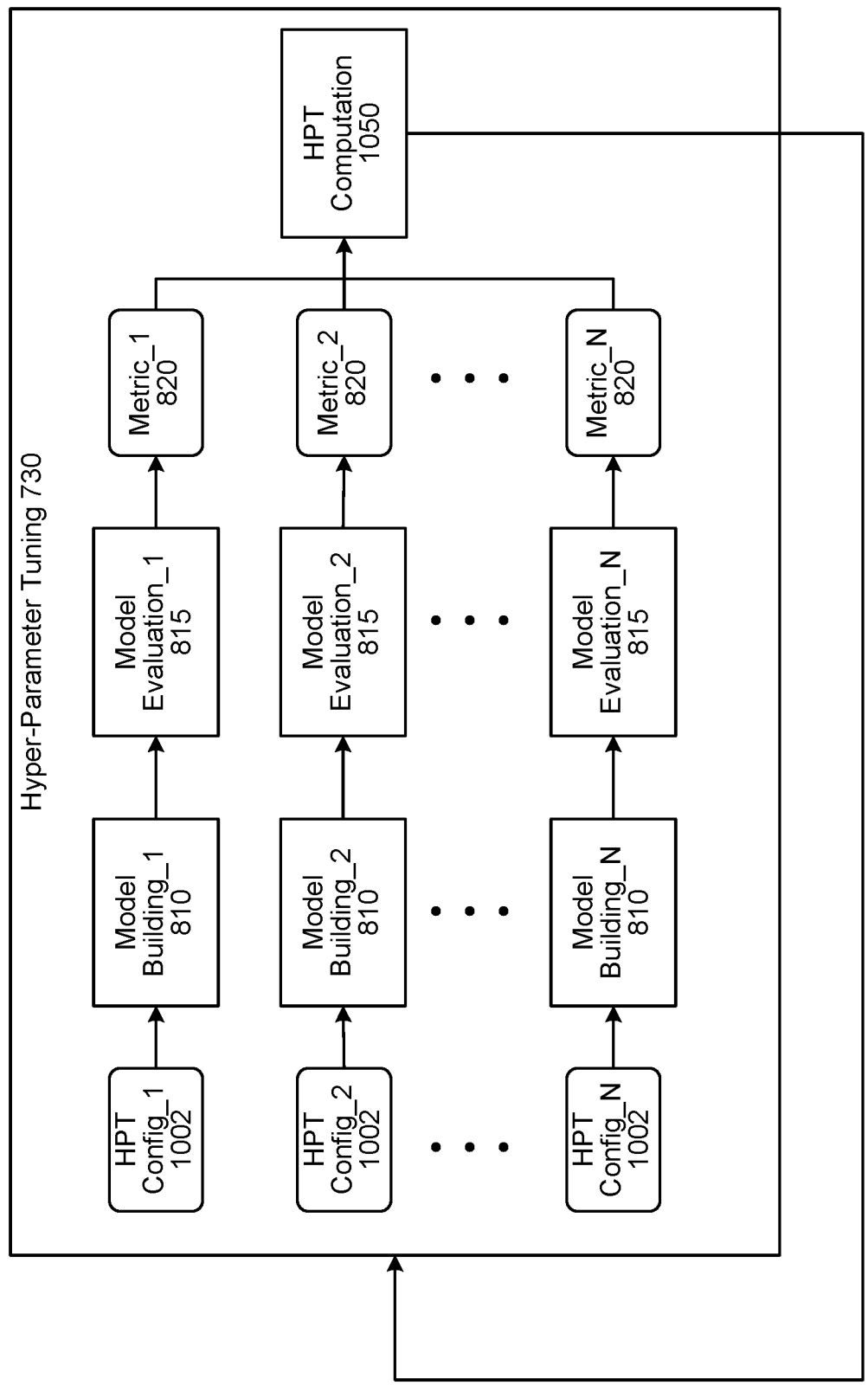
FIG. 10 is a conceptual diagram illustrating how a hyper-parameter tuning component may process different model configurations in parallel, according to embodiments of the present disclosure.

In some embodiments, a distributed set of HPT components 730 (e.g., HPT component 703*a*, HPT component 730*b*, etc.) may be implemented, and may be decoupled from each other, to handle parameter tuning for multiple different ML models at the same time. For example, if there are ten domain classification models, then there may be ten instances of the HPT component 730 to tune parameters for each of the domain classification models. Each instance of the HPT component 730 may test and evaluate multiple parameter values in parallel, as shown in FIG. 10.

In some embodiments, there may be multiple instances of the file weights tuning component 720 (e.g., file weights tuning component 720*a*, file weights tuning component 720*b*, etc.), and each may be decoupled for each other, to handle file weights tuning for multiple different ML models at the same time. For example, if there are ten domain classification models, then there may ten instances of the file weights tuning component 720 to determine file weights for each of the domain classification models. Each instance of the file weights tuning component 720 may test and evaluate multiple weight values in parallel, in a similar fashion as described in connection to the HPT component 730.

In some embodiments, the remote system 115 may tune parameters for ML models representing end-to-end functions of the NLP system 120. For example, the remote system 115 may determine file weights for data to be used to configure the ML models. Then the remote system 115 may tune parameters for a domain classification model, then use the tuned/optimized domain classification model to tune (evaluate) parameters for an intent classification model, and then use the tuned/optimized intent classification model to tune (evaluate) parameters for a NER model.

Figure 8:
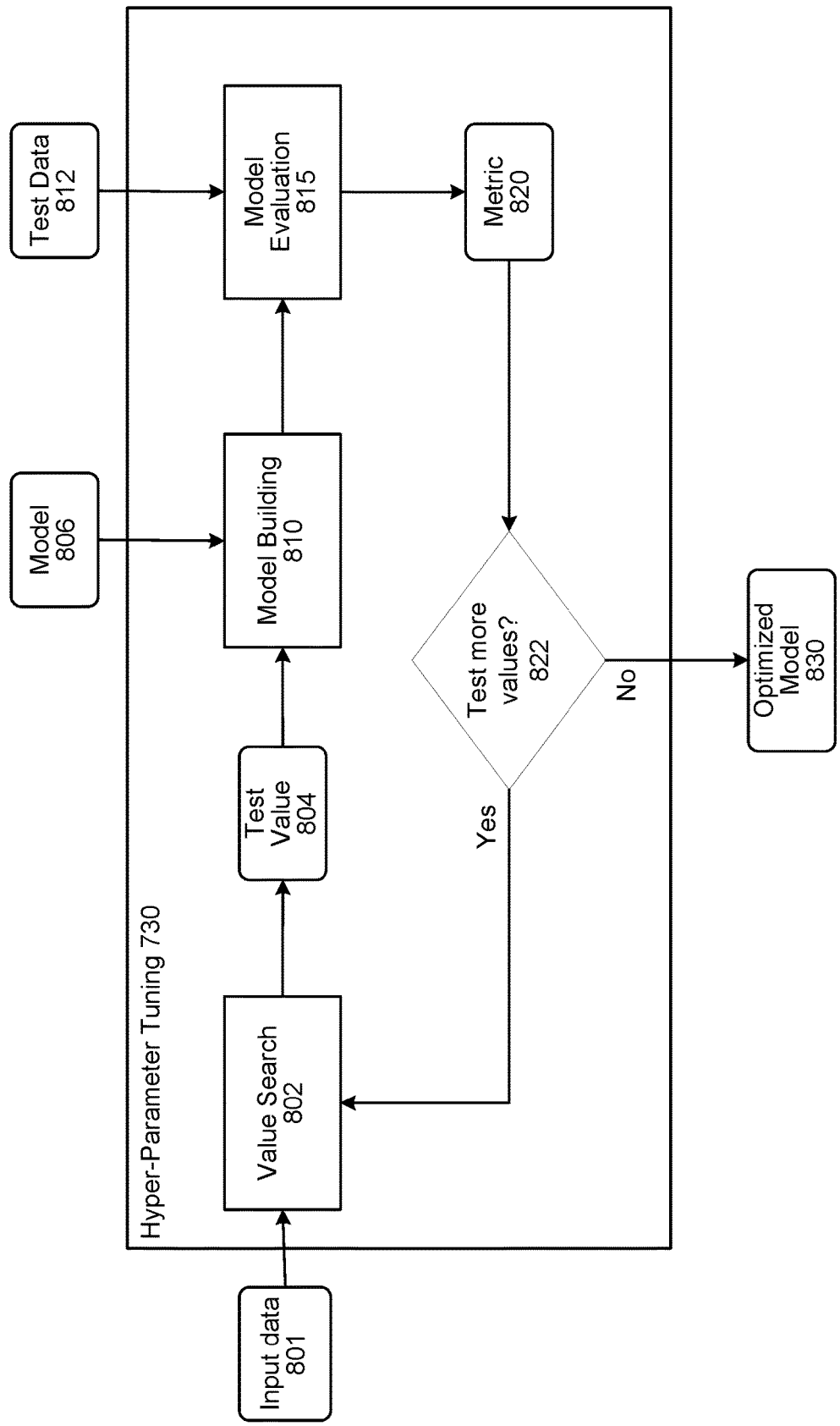
FIG. 8 is a conceptual diagram illustrating how a hyper-parameter tuning component may determine an optimized machine learning model, according to embodiments of the present disclosure.

FIG. 8 is a conceptual diagram illustrating how the HPT component 730 may determine an optimized model, according to embodiments of the present disclosure. The HPT component 730 may include one or more components shown in the FIG. 8. In other embodiments, the HPT component 730 may communicate with one or more components shown in FIG. 8, and they may not be included within the HPT component 730. For example, the HPT component 730 may communicate with a model building component 810 to generate a model configuration using a parameter test value 804.

The HPT component 730 may include a value search component 802 configured to determine values to be tested for a parameter. The value search component 802 may use input data 801, which may include one or more parameters to be tuned (e.g., 738), a range of values for the parameter(s), type of parameter value (e.g., discrete, continuous, integer, float, etc.), and other information related to the parameter(s) to be tuned. The value search component 802 may employ one or more search strategies and may generate a search space that may be represented using graph data. The search space may be based on a correlation between the parameter value and the metric corresponding to the model configured using that parameter value. For the first trial, the value search component 802 may select a first value for the parameter to test. After the model is configured using the selected parameter value and trained, the model is evaluated using some test data. A first metric corresponding to the evaluated model is associated with the first value, and the value search component 802 determines a search space using the first value and the first metric. If the HPT component 730 is to determine values for multiple parameters for an optimized model, then the first metric is associated with the values for the multiple parameters. For example, the first metric may be associated with a first value for a first parameter (e.g., learning rate), a second value for a second parameter (e.g., number of layers), a third value for a third parameter (e.g., batch size), etc.

For the next trial, the value search component 802 may select a parameter value using the generated search space. In doing so, the value search component 802 is not randomly testing values for a parameter, but rather selects a value based on a likelihood of the value resulting in an improvement in the metric. In some embodiments, the value search component 802 may employ a Gaussian process/algorithm to generate the search space. A Gaussian process may be a stochastic process (a collection of random variables indexed by time or space), such that every finite collection of those random variables has a multivariate normal distribution, i.e. every finite linear combination of them is normally distributed. The distribution of a Gaussian process may be the joint distribution of all those (infinitely many) random variables, and as such, it is a distribution over functions with a continuous domain, for example, time or space. A machine-learning algorithm that involves a Gaussian process may use lazy learning and a measure of the similarity between points (the kernel function) to predict the value for an unseen point from training data. The prediction is not just an estimate for that point, but also has some uncertainty information. For some kernel functions, matrix algebra may be used to calculate the predictions. Gaussian processes are useful in statistical modelling, benefiting from properties inherited from the normal distribution. For example, if a random process is modelled as a Gaussian process, the distributions of various derived quantities can be obtained explicitly. Such quantities include the average value of the process over a range of times and the error in estimating the average using sample values at a small set of times.

The value search component 802 may define a search space that includes one or more parameters (for example, when the parameters to be tuned are not provided, and rather the user wants the HPT component 730 to determine which parameters should be tuned). For example, if the model to be evaluated by the HPT component 730 is a neural network, then the set of parameters for the search space may include all possible parameters of a neural network architecture, like the maximum number of layers, types of operations like pooling, convolution, dilated convolution, number of filters, kernel size, strides, etc. (in addition to the parameters described herein, like learning rate, batch size, etc.).

The value search component 802 may employ one or more optimization techniques that defines the exploration-exploitation tradeoff to optimize searching in the search space. Example optimization techniques may be random search, reinforcement learning, evolutionary search, gradient based, or Bayesian optimization.

Bayesian optimization is an algorithm that helps to pick the next set of promising parameters to be evaluated. A Gaussian process (GP) approximation (surrogate) model is learned over the f=metric_on_development_set(parameters) function based on historically collected pairs of (parameter value, metric) data. A utility function that trades off between high GP mean (exploitation) and high GP variance (exploration) is then maximized to then find promising/viable parameters to test. The metric is determined with respect to the parameter value and the new (parameter value, metric) pair is used to update the GP.

In some embodiments, the HPT component 730 tests multiple parameter values in parallel (as described in connection to FIG. 10), and the value search component 730 may select multiple values to test in parallel.

The value search component 802 may provide one or more test values 804 to a model building component 810. The model building component 810 may use the first test value 804 and model data 806 to generate a first model configuration for evaluation. The model data 806 may represent data corresponding to the model for which parameter values are to be tuned.

The model building component 810 may send the first model configuration to a model evaluation component 815 to test the first model configuration. The model evaluation component 815 may process test data 812 using the first model configuration to determine metric data 820. The test data 812 may include one or more inputs that the model 806 is to be configured to process successfully. The metric 820 may be a first metric associated with the first test value 804. The metric 820 may correspond to an input metric (e.g., 736) provided to the HPT component 730, in that the metric 820 may be the same type as the input metric. The metric 820 may be a performance metric relating to a performance accuracy of the first model configuration, a performance efficiency of the first model configuration, or a loss relating to the first model configuration.

The model evaluation component 815 may employ a technique to efficiently evaluate a metric without having to fully train the model. Such a technique may include early stopping criteria, network morphism, weight sharing, hypernetworks (partial training or weight sharing), etc.

In some embodiments, the HPT component 730 is configured to conduct a one-factor-at-a-time sensitivity analysis in which only one parameter of the ML model is varied keeping the rest of the parameters fixed at the value of the baseline/input ML model. Then the variation in the metric 820 as a result of the variation in this specific parameter is analyzed. If the ML model's sensitivity is very low (as determined using variations in the metric 820 corresponding to variations in the parameter value; as compared to a condition of a threshold variation value) for a particular parameter(s), the particular parameter(s) can be set to a particular value and parameter tuning with respect to these parameters can cease. In other words, some parameters of a ML model may not affect performance of the ML model. Once the HPT component 730 identifies such a parameter, the HPT component 730 moves on to tune (test and evaluate) other parameters of the ML model.

In some embodiments, the model evaluation component 815 may employ an early stopping criteria and cease evaluation of a particular model configuration. In the early stopping criteria, the model evaluation component 815 may determine whether the ML model configured with a particular parameter value is converging or diverging. If the ML model is diverging, then the model evaluation component 815 may cease further evaluation (stop performing further iterations/epochs) of the particular parameter value. In some embodiments, the model building component 810 may determine that the ML model with the particular parameter value is diverging (resulting in divergent weights, divergent model output, divergent model predictions, etc.), and may stop training the ML model, thus ceasing further evaluation of the ML model. A ML model may be convergent or may be converging when it progresses towards a model state where the model has learned to properly respond to a set of training patterns within a margin of error. A ML model may be divergent or may be diverging when it moves away from the model state where the model is not able to properly respond to a set of training patterns within the margin of error.

Using the metric 820, the HPT component 730 determines (822) whether more values for the parameter(s) are to be tested. At decision 822, the HPT component 730 may consider one or more stopping criterion (e.g., stopping criteria data 742). The stopping criteria data 742 may indicate one or more criterion/conditions that when met/satisfied indicates to the HPT component 730 to cease evaluation/processing. Without a stopping criteria, the HPT component 730 may, in some embodiments, continue processing until the most optimized model configuration is determined. The stopping criteria data 742 may relate to a maximum number of trials the HPT component 730 is to perform (i.e. the number of parameter values to evaluate, the number of different model configurations to evaluate, etc.). The stopping criteria data 742 may relate to an amount of time the HPT component 730 is to spend evaluating different parameter values (for example, 4 hours, 8 hours, 24 hours, etc.). With respect to such stopping criteria, the HPT component 730 may track the time spent processing by starting a timer when the HPT component 730 begins training of a first model using a first parameter value, and when the timer reaches the time indicated in the stopping criteria data 742, the HPT component 730 may cease further processing. At that point, the HPT component 730 may determine the optimized model 750 from the model configurations tested so far by selecting the model with the best performance metric. The stopping criteria data 742 may relate to a number of epochs/iterations to perform when evaluating a parameter value.

The stopping criteria data 742 may relate to an amount of improvement to be achieved/realized with respect to the performance metric represented by the metric data 740. In that case, at decision 822, the HPT component 730 may compare the metric 820 to the input metric 736 to determine whether the difference satisfies the amount of improvement indicated by the stopping criteria 742. For example, the stopping criteria 742 may indicate that an improvement of 0.5 is to be realized with respect to the metric, the metric corresponding to the input model 806 may be 1.5 and the metric 820 may be 2.0 (or higher). In this case, the stopping criteria relating to an improvement in metric is satisfied, and the HPT component 730 may determine to not test more values, and store the first model configuration as the optimized model 830.

In other embodiments, the stopping criteria 742 may indicate a metric stop value representing a value (e.g., 0.0001) beyond which the metric stops improving within a number of trials. For example, during the most recently performed 10 trials, the improvement in the metric was not more than the metric stop value −0.0001. This may indicate that the HPT component 730 may not perform any more trials that will result in a significant change in the metric, and the HPT component 730 is not configured to perform infinite trials. In other embodiments, the stopping criteria data 742 may indicate to cease parameter tuning when the improvement of the metric 820 plateaus over a number of iterations, in which a standard deviation of the metric 820 over N iterations is smaller than a value indicated in the stopping criteria data 742.

At decision 822, the HPT component 730 may also determine if there are other viable values for the parameter(s) that have not yet been tested. A viable value may be one that the value search component 802 determines to have a certain likelihood to cause an improvement in the metric.

In evaluating the stopping criteria data 742, the HPT component 730 may keep track of the metric 820 for previous trials or iterations of evaluating one or more parameter values.

If the HPT component 730 determines to test more values, then the value search component 802 selects another value (a second value) for the parameter(s), sends the second test value 804 to the model building component 810, which generates a second model configuration using the second test value 804, and evaluates the second model configuration using the model evaluation component 815 to generate a second metric 820 corresponding to the second model configuration and the second test value for the parameter(s).

In some embodiments, the model evaluation component 815 may need other components or models to evaluate the model of interest. For example, if the model to be evaluated is a IC model, the model evaluation component 815 may need a DC model and/or a NER model to determine whether test data 812 is being properly processed by the IC model. In this case, the test data 812 may be the output of the DC model, the model evaluation component 815 may process the test data 812 using the IC model configured using the test value 804, and input the results of that processing to the NER model.

In some embodiments, the model evaluation component 815 may use a smaller model or a proxy model that corresponds to the DC model, IC model and/or the NER model to evaluate parameter values. Thus, the HPT component 730 need not invoke/run large NLP models to test one or more of the NLP models. A proxy model may mirror the entire input model or portions of the input model, and may derive data from the some data source as the input model.

In some embodiments, the HPT component 730 may tune the model for a combination of two or more parameters during a single trial. For example, the HPT component 730 may test a combination of parameter values, such as, {learning rate=0.5; batch size=0.5}, and configure the model using both of the parameter values. In other embodiments, the HPT component 730 may tune the model for a single parameter during a single trial. For example, the HPT component 730 may test values for the learning rate. Once a parameter for the learning rate is determined to be optimized, then the HPT component 730 may test values for the batch size.

Figure 9:
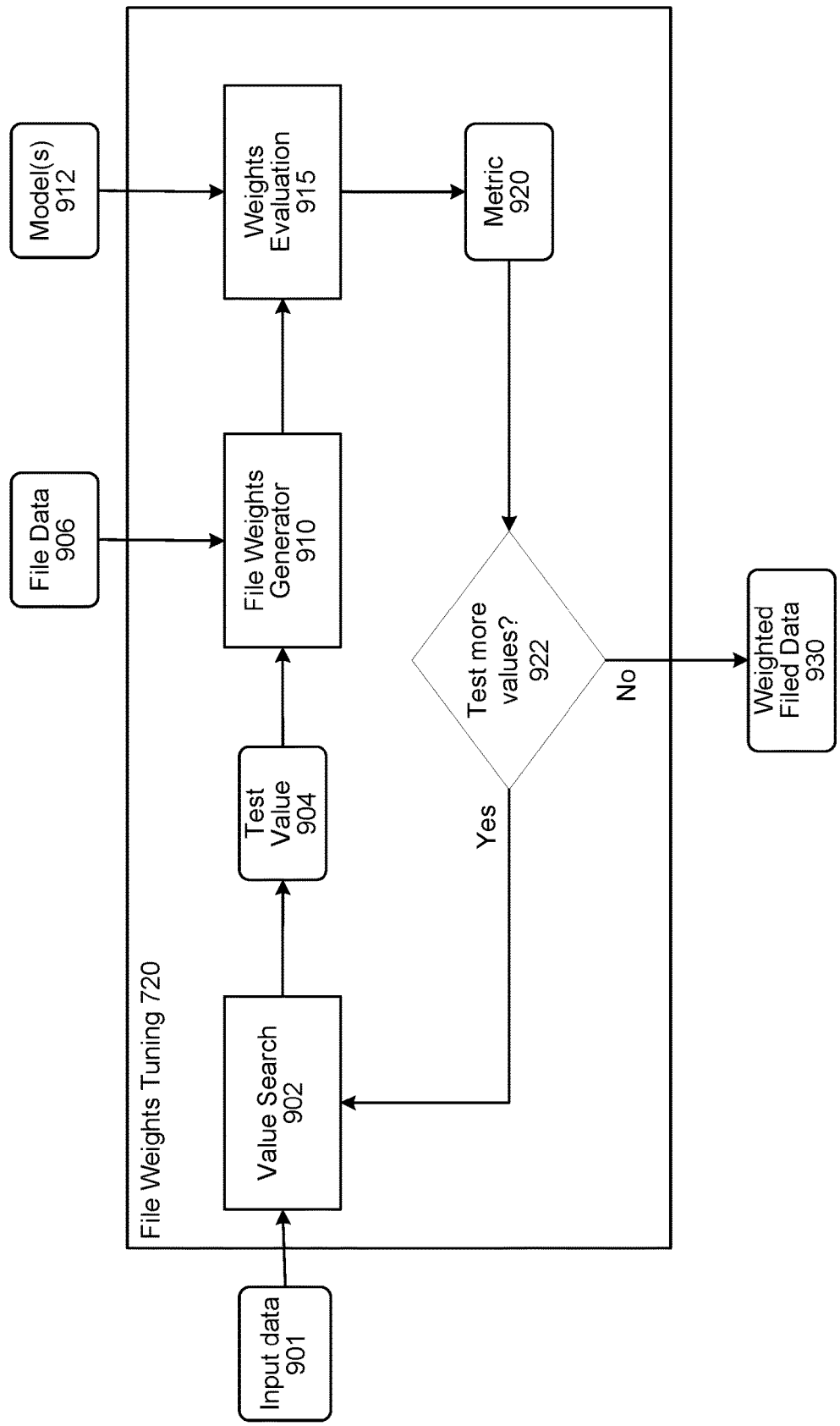
FIG. 9 is a conceptual diagram illustrating how a file weights tuning component may determine file weights, according to embodiments of the present disclosure.

FIG. 9 is a conceptual diagram illustrating how the file weights tuning component 720 may determine file weights, according to embodiments of the present disclosure. The file weights tuning component 720 may tune file weights and re-ranker file mixing weights.

The system may periodically update the NLP models using user inputs received by the NLP system during a period of time (e.g., using user inputs received within the last 30 days). These user inputs may be represented in the file data 906. The file weights tuning component 720 may determine file weights for all the user inputs in the file data 906. In other embodiments, the file weights tuning component 720 may determine file weights for new user inputs only, which are user inputs that the NLP system have not received before (for example, before the 30 days period). In this case, for the previously received user inputs, the file weights tuning component 720 may use the file weights that were already assigned/associated with the user inputs previously received by the NLP system.

The file weights tuning component 720 may include a value search component 902 configured to determine a set of values to test for the file weights. The value search component 902 may employ one or more search strategies, such as, Bayesian optimization, to determine values to test for file weights. The value search component 902 may receive input data 901 representing information related to the file weights to be tuned, such as, the range of values to be tested, the type of value the file weight may be, etc. The value search component 702 may send one or more test values 904 to a file weights generator component 910. The file weights generator component 910 may be configured to generate weighted file data to be tested/evaluated for a performance metric. The file weights generator component 910 may use the test value 904 and the file data 906 to determine the weighted file data to be tested. The weighted file data may be sent to a weights evaluation component 915 configured to evaluate the file weights using one or more models 912.

For example, in the case that NLP models are to be tuned, the file data 906 represents user inputs received by the NLP models. The weights evaluation component 915 evaluates the weighted file data associated with the test value 904 using one or more NLP models to determine a metric 920. In some embodiments, the models 912 may be a language model, and the metric 920 may relate to perplexity. The metric 920 with respect to which the file weights are tested may include, perplexity, semER, DCER, performance accuracy, performance efficiency, etc. The model(s) 912 may be a language model, a DC model, an IC model, an NER model, etc.

The file weights tuning component 720 may determine (922) whether more weight values should be tested. In this determination, the file weights tuning component 720 may consider one or more stopping criterion, such as, the number of trials to run, the amount of time to spend determining file weights, the amount of improvement to be achieved with respect to the metric, etc. If more values are to be tested, then the value search component 902 may select another test value 904 for the file weights generator component 910 to determine second weighted file data to be evaluated by the weights evaluation component 915. If more values are not to be tested (because the stopping criteria is met or the metric 920 is the most optimal value), then the weighted file data that was evaluated is stored as weighted file data 930 (which may be provided to the HPT component 730 as input).

The file weights tuning component 720 may test multiple weight values in parallel, and may employ a scheduler to manage multiple workers generating and evaluating weighted file data.

FIG. 10 is a conceptual diagram illustrating how a hyperparameter tuning component may process different model configurations in parallel, according to embodiments of the present disclosure. In some embodiments, the HPT component 730 may employ an asynchronous hyperband scheduler. Using such a scheduler technique, given a resource allocation and minimum early-stopping rate a worker/component trains a model with the parameter values chosen by the value search component 802 for the maximum resource amount. A job may be promoted to the next step if the development loss places it in the top 1/n fraction of the completed configurations. Otherwise evaluation of a new parameter configuration (determined by the value search component 802) is started.

Using multiple workers to perform parallel evaluations may reduce the amount of time it takes to determine parameter values that result in the optimized model. As shown in the FIG. 10, the HPT component 730 may run multiple model building components 810, multiple model evaluation components 815, and determine multiple metric data 820. A HPT computation component 1050 may process the multiple metric data 820 to generate the search space used to determine which parameter values to test next. HPT config data 1002, in this case, may include various input data provided to the HPT component 730, such as, the parameters to be tuned (e.g., 738), metric to be improved (e.g., 740), model to be tuned (e.g., 736), training/validation data (e.g., 732, 734), etc.

Figure 11:
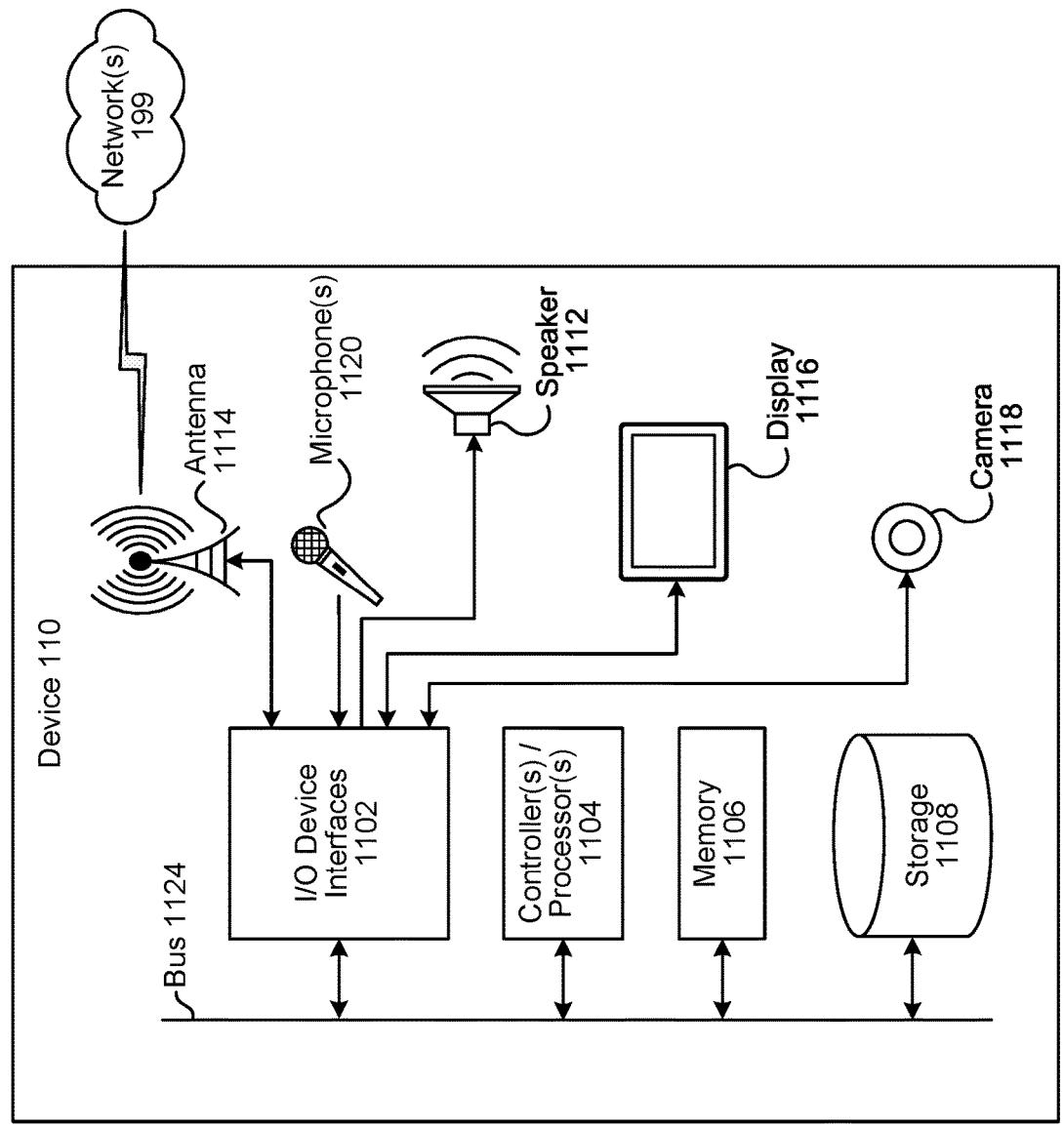
FIG. 11 is a block diagram conceptually illustrating example components of a device, according to embodiments of the present disclosure.
Figure 12:
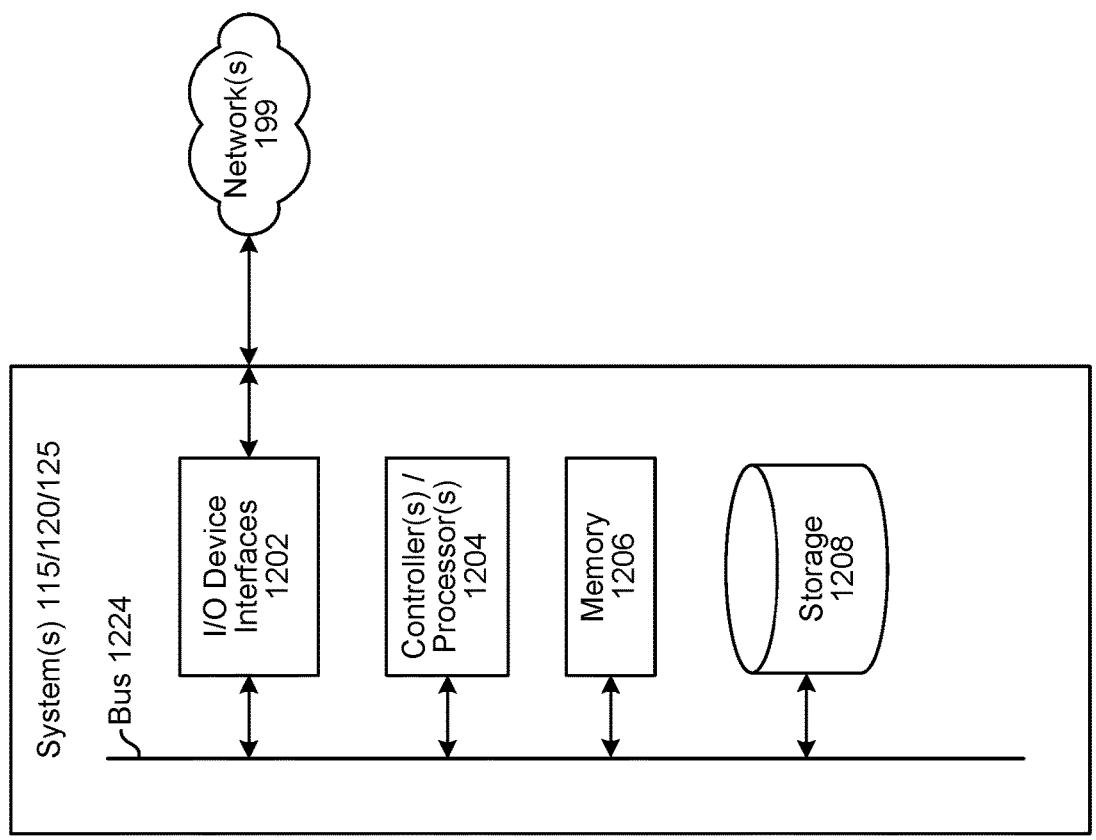
FIG. 12 is a block diagram conceptually illustrating example components of a system, according to embodiments of the present disclosure.

FIG. 11 is a block diagram conceptually illustrating example components of a device 110 according to the present disclosure. FIG. 12 is a block diagram conceptually illustrating example components of a system, such as the remote system 115, the NLP system 120 or the skill system 125. A system (115/120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The NLP system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (115/120/125) may be included in the system 100 of the present disclosure, such as one or more remote systems 115 for configuring ML models and tuning parameter values, one or more NLP systems 120 for performing ASR processing, one or more NLP systems 120 for performing NLU processing, and one or more skill component 125, etc. In operation, each of these systems may include computer-readable and computer-executable instructions that reside on the respective device (115/120/125), as will be discussed further below.

Each of these devices (110/115/120/125) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/115/120/125) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1102/1202).

Computer instructions for operating each device (110/115/120/125) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/115/120/125) includes input/output device interfaces (1102/1202). A variety of components may be connected through the input/output device interfaces (1102/1202), as will be discussed further below. Additionally, each device (110/115/120/125) may include an address/data bus (1124/1224) for conveying data among components of the respective device. Each component within a device (110/115/120/125) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device 110, the remote system 115, the NLP system 120, and/or a skill component 125 may include their own dedicated processors, memory, and/or storage. Alternatively, one or more of the components of the device 110, the remote system 115, the NLP system 120, and/or a skill component 125 may utilize the I/O interfaces (1102/1202), processor(s) (1104/1204), memory (1106/1206), and/or storage (1108/1208) of the device(s) 110, the remote system 115, the NLP system 120, or the skill component 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 115, the NLP system 120, and a skill component 125, as described herein, are illustrative, and may be located as a stand-alone device or may be included, in whole or in part, as a component of a larger device or system.

Figure 13:
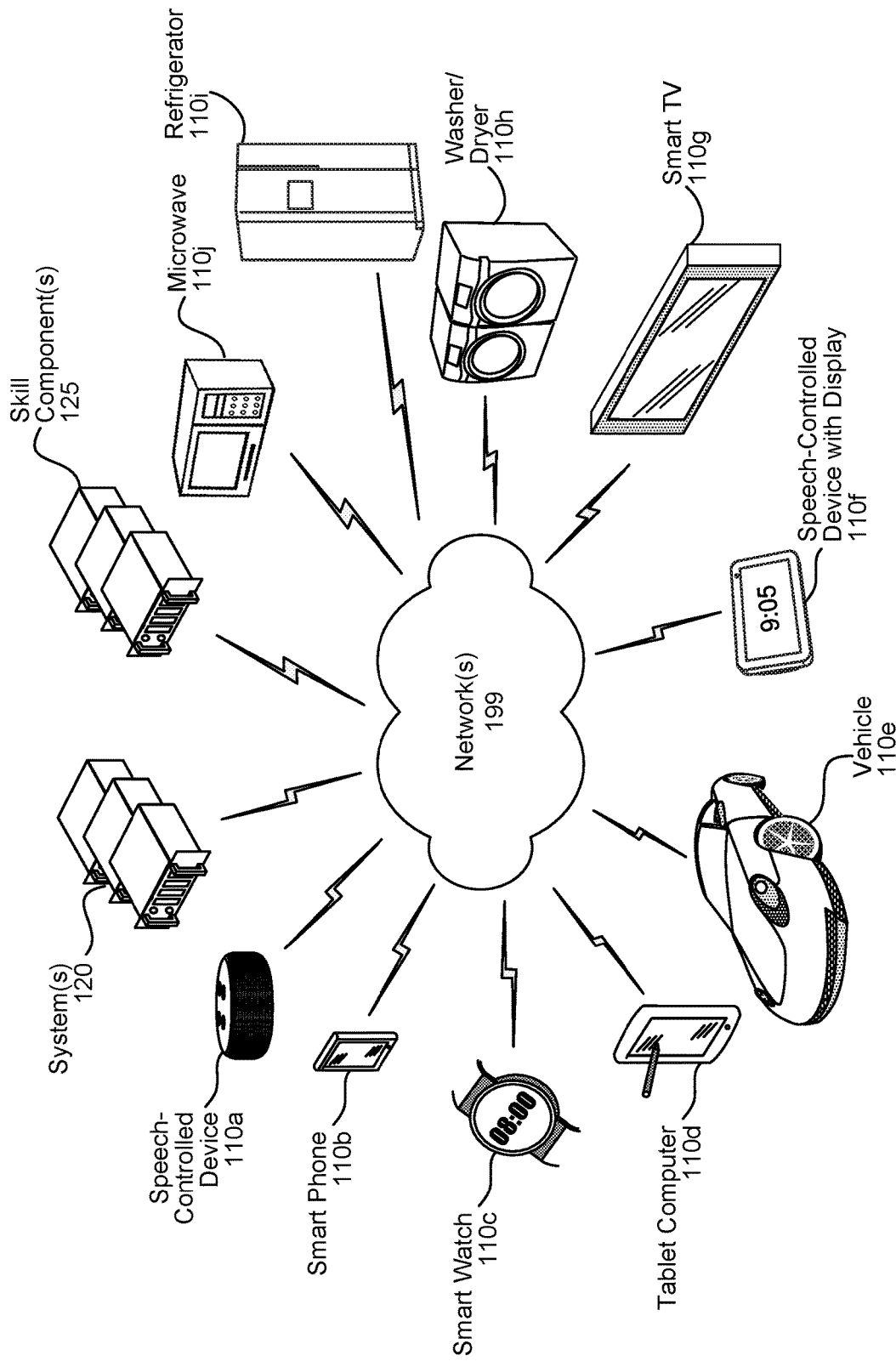
FIG. 13 illustrates an example of a computer network for use with the overall system, according to embodiments of the present disclosure.

As illustrated in FIG. 13, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the remote system 115, the NLP system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the NLP system 120.

Figure 14:
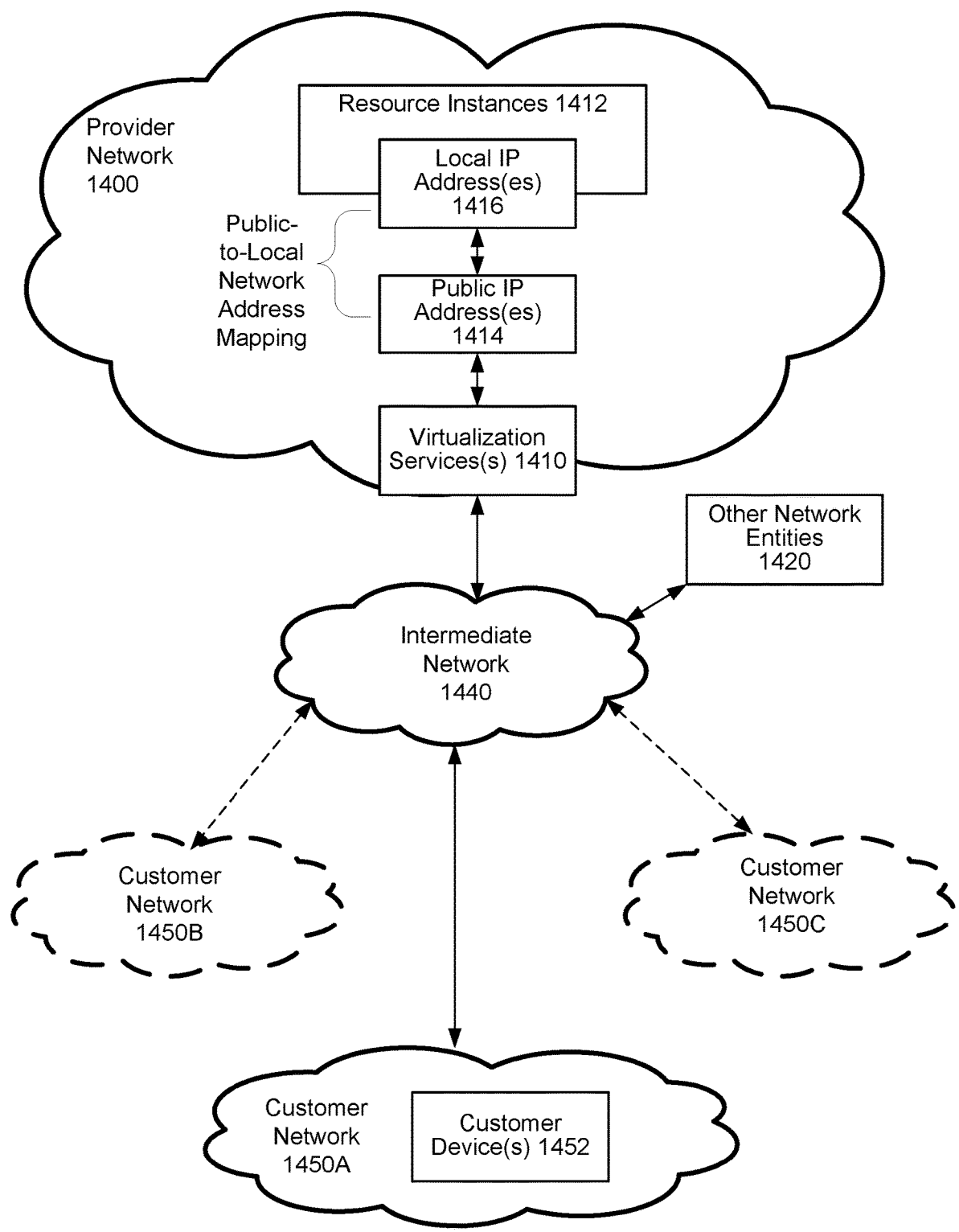
FIG. 14 illustrates an example provider network environment according to some embodiments.

FIG. 14 illustrates an example provider network (or "service provider system") environment according to some embodiments. A provider network 1400 may provide resource virtualization to customers via one or more virtualization services 1410 that allow customers to purchase, rent, or otherwise obtain instances 1412 of virtualized resources, including but not limited to computation and storage resources, implemented on devices within the provider network or networks in one or more data centers. Local Internet Protocol (IP) addresses 1416 may be associated with the resource instances 1412; the local IP addresses are the internal network addresses of the resource instances 1412 on the provider network 1400. In some embodiments, the provider network 1400 may also provide public IP addresses 1414 and/or public IP address ranges (e.g., Internet Protocol version 4 (IPv4) or Internet Protocol version 6 (IPv6) addresses) that customers may obtain from the provider 1400.

Conventionally, the provider network 1400, via the virtualization services 1410, may allow a customer of the service provider (e.g., a customer that operates one or more client networks 1450A-1450C including one or more customer device(s) 1452) to dynamically associate at least some public IP addresses 1414 assigned or allocated to the customer with particular resource instances 1412 assigned to the customer. The provider network 1400 may also allow the customer to remap a public IP address 1414, previously mapped to one virtualized computing resource instance 1412 allocated to the customer, to another virtualized computing resource instance 1412 that is also allocated to the customer. Using the virtualized computing resource instances 1412 and public IP addresses 1414 provided by the service provider, a customer of the service provider such as the operator of customer network(s) 1450A-1450C may, for example, implement customer-specific applications and present the customer's applications on an intermediate network 1440, such as the Internet. Other network entities 1420 on the intermediate network 1440 may then generate traffic to a destination public IP address 1414 published by the customer network(s) 1450A-1450C; the traffic is routed to the service provider data center, and at the data center is routed, via a network substrate, to the local IP address 1416 of the virtualized computing resource instance 1412 currently mapped to the destination public IP address 1414. Similarly, response traffic from the virtualized computing resource instance 1412 may be routed via the network substrate back onto the intermediate network 1440 to the source entity 1420.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1400; a customer may then assign their allocated public IP addresses to particular resource instances allocated to the customer. These public IP addresses may be referred to as customer public IP addresses, or simply customer IP addresses. Instead of being assigned by the provider network 1400 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 15:
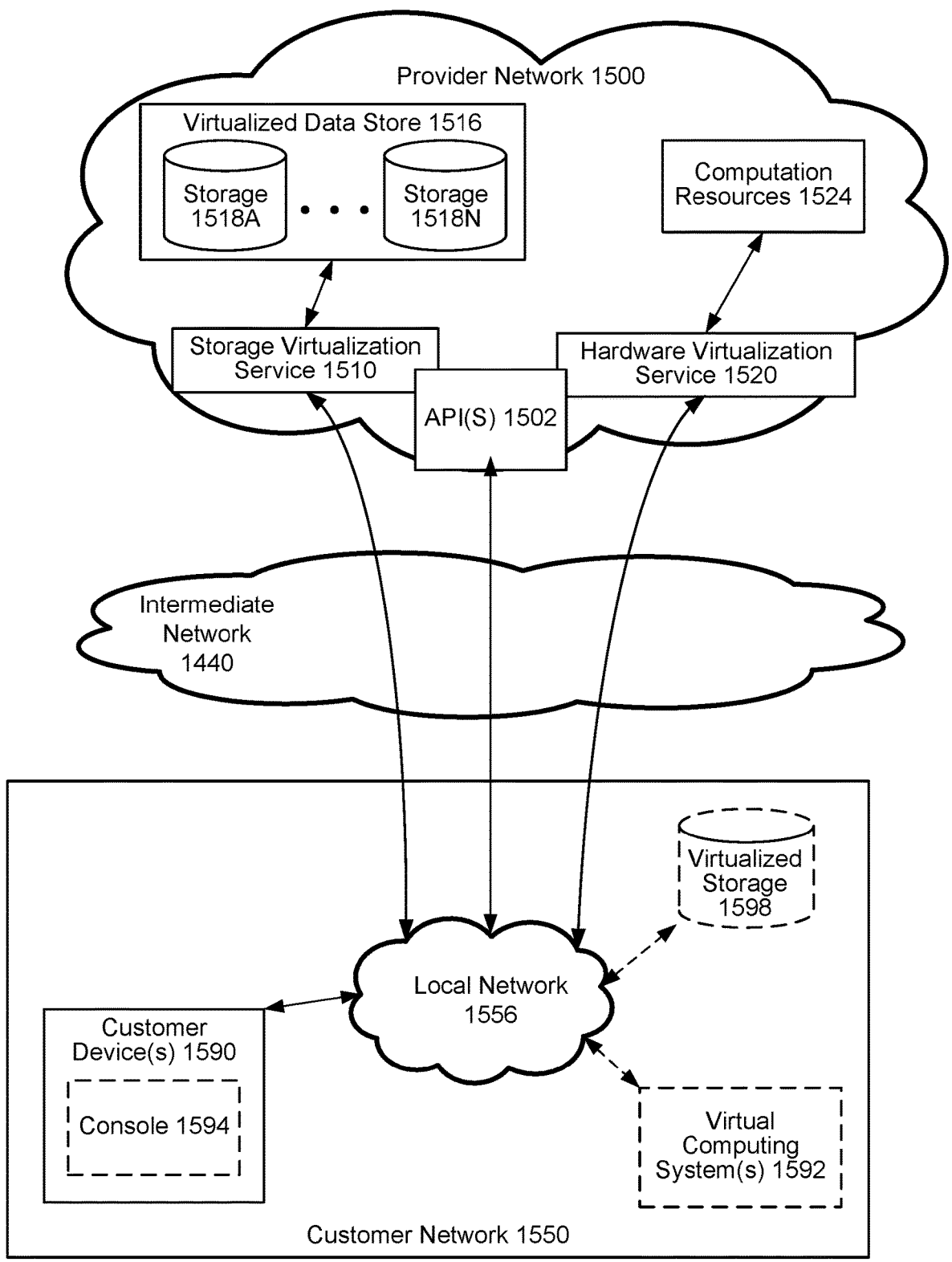
FIG. 15 is a block diagram of an example provider network that provides a storage virtualization service and a hardware virtualization service to customers according to some embodiments.

FIG. 15 is a block diagram of an example provider network that provides a storage virtualization service and a hardware virtualization service to customers, according to some embodiments. Hardware virtualization service 920 provides multiple computation resources 1524 (e.g., VMs) to customers. The computation resources 1524 may, for example, be rented or leased to customers of the provider network 1500 (e.g., to a customer that implements customer network 1550). Each computation resource 1524 may be provided with one or more local IP addresses. Provider network 1500 may be configured to route packets from the local IP addresses of the computation resources 1524 to public Internet destinations, and from public Internet sources to the local IP addresses of computation resources 1524.

Provider network 1500 may provide a customer network 1550, for example coupled to intermediate network 1540 via local network 1556, the ability to implement virtual computing systems 1592 via hardware virtualization service 1520 coupled to intermediate network 1540 and to provider network 1500. In some embodiments, hardware virtualization service 1520 may provide one or more APIs 1502, for example a web services interface, via which a customer network 1550 may access functionality provided by the hardware virtualization service 1520, for example via a console 1594 (e.g., a web-based application, standalone application, mobile application, etc.). In some embodiments, at the provider network 1500, each virtual computing system 1592 at customer network 1550 may correspond to a computation resource 1524 that is leased, rented, or otherwise provided to customer network 1550.

From an instance of a virtual computing system 1592 and/or another customer device 1590 (e.g., via console 1594), the customer may access the functionality of storage virtualization service 1510, for example via one or more APIs 1502, to access data from and store data to storage resources 1518A-1518N of a virtual data store 1516 provided by the provider network 1500. In some embodiments, a virtualized data store gateway (not shown) may be provided at the customer network 1550 that may locally cache at least some data, for example frequently accessed or critical data, and that may communicate with virtualized data store service 1510 via one or more communications channels to upload new or modified data from a local cache so that the primary store of data (virtualized data store 1516) is maintained. In some embodiments, a user, via a virtual computing system 1592 and/or on another customer device 1590, may mount and access virtual data store 1516 volumes, which appear to the user as local virtualized storage 1598.

While not shown in FIG. 15, the virtualization service(s) may also be accessed from resource instances within the provider network 1500 via API(s) 1502. For example, a customer, appliance service provider, or other entity may access a virtualization service from within a respective virtual network on the provider network 1500 via an API 1502 to request allocation of one or more resource instances within the virtual network or within another virtual network.

Using an API 1502 corresponding to the hyper-parameter tuning component 730, a user may initiate tuning of one or more parameters for a trained model, as described herein. Using an API 1502 corresponding to the file weights tuning component 720, a user may initiate tuning of file weights as described herein.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   generating, using a first machine learning (ML) model configured to perform natural language processing first output data responsive to a first user input, wherein the first ML model is associated with a first hyper-parameter having a first value;
   determining the first output data corresponds to an undesired response to the first user input;
   based at least in part on determining the first output data corresponds to the undesired response to the first user input, generating a second ML model corresponding to the first ML model, wherein the second ML model is associated with the first hyper-parameter having a second value instead of the first value;
   processing a first set of user inputs using the second ML model;

determining a first metric value corresponding to processing of the first set of user inputs using the second ML model;
determining a number of values to test for the first hyper-parameter;
determining the number of values is satisfied by processing of the first set of user inputs using the second ML model; and
based on the first metric value and the number of values being satisfied, storing the second ML model for processing of future user inputs.

2. The computer-implemented method of claim 1, further comprising:
determining a second metric value associated with the processing of the first set of user inputs by the first ML model;
determining first data including the second metric value and the first value;
selecting a third value for the first hyper-parameter;
determining a third ML model using the third value, the third ML model configured to perform natural language processing;
processing the first set of user inputs using the third ML model;
determining a third metric value associated with the processing of the first set of user inputs by the third ML model;
determining second data including the third metric value and the third value;
determining a graph using the first data and the second data; and
selecting the second value based on the graph.

3. The computer-implemented method of claim 1, further comprising:
receiving first file data including a second set of user inputs, wherein the first ML model is to be configured to process the second set of user inputs;
selecting a third value for a second hyper-parameter corresponding to the first file data;
processing the first file data and the third value using the first ML model;
determining a second metric value associated with the processing of the first file data and the third value;
determining the second metric value fails to satisfy a condition;
based on determining the second metric value fails to satisfy the condition, selecting a fourth value for the second hyper-parameter;
processing the first file data and the fourth value using the first ML model;
determining a third metric value associated with the processing of the first file data and the fourth value;
determining the third metric value satisfies the condition;
based on the third metric value satisfying the condition, determining second file data to include the first file data and the fourth value; and
processing the second file data using the first ML model.

4. The computer-implemented method of claim 1, further comprising:
receiving a stopping criterion for testing values for the first hyper-parameter, the stopping criterion indicating a minimum delta metric value to be realized;
determining a second metric value corresponding to processing of the first set of user inputs by the first ML model;
selecting a third value for the first hyper-parameter;
determining a third ML model corresponding to the first ML model, the third ML model being associated with the first hyper-parameter having the third value, the third ML model configured to perform natural language processing;
processing the first set of user inputs using the third ML model;
determining a third metric value corresponding to processing of the first set of user inputs by the third ML model;
determining first data representing a first difference between the first metric value and the second metric value;
determining second data representing a second difference between the first metric value and the third metric value;
determining third data representing a third difference between the second metric value and the third metric value;
processing the stopping criterion with respect to the first data, the second data and the third data;
determining to cease further evaluation of the first hyper-parameter; and
after determining to cease further evaluation of the first hyper-parameter, storing the second ML model.

5. A computer-implemented method comprising:
generating, using a first model first output data responsive to a first user input, wherein the first model is associated with a first parameter having a first value;
determining the first output data corresponds to an undesired response to the first user input;
based at least in part on determining the first output data corresponds to the undesired response to the first user input, determining a second model corresponding to the first model with the first parameter having a second value;
processing first input data using the second model;
determining first metric data corresponding to the processing of the first input data using the second model; and
based at least in part on the first metric data, storing the second model for processing future user inputs.

6. The computer-implemented method of claim 5, further comprising:
determining first data associating the first metric data and the first value;
based at least in part on determining the first output data corresponds to the undesired response to the first user input, determining a third model corresponding to the first model with the first parameter having a third value;
processing the first input data using the third model;
determining second metric data associated with the processing of the first input data using the third model;
determining second data associating the second metric data and the third value; and
determining a set of values to test for the first parameter using at least the first data and the second data.

7. The computer-implemented method of claim 6, further comprising:
selecting a fourth value from the set of values;
determining a fourth model corresponding to the first model with the first parameter having the fourth value;
selecting a fifth value from the set of values;
determining a fifth model corresponding to the first model with the first parameter having the fifth value;

processing the first input data using the fourth model; and processing the first input data using the fifth model at least partially in parallel with the fourth model processing the first input data.

8. The computer-implemented method of claim 5, further comprising:

selecting a third value for a second parameter associated with the first model;

determining a third model using the first value and the third value;

processing the first input data using the third model;

determining second metric data corresponding to the processing of the first input data using the third model;

selecting a fourth value for the second parameter;

determining a fourth model using the first value and the fourth value;

processing the first input data using the fourth model;

determining third metric data corresponding to the processing of the first input data using the fourth model;

determining a difference between the second metric data and the third metric data; and based on the difference, ceasing evaluation of the second parameter for the first model.

9. The computer-implemented method of claim 5, further comprising:

receiving first file data including second input data, wherein the first model is to be configured to process the second input data;

selecting a third value for a second parameter corresponding to the first file data;

processing the first file data using the first model with the second parameter having the third value;

determining second metric data associated with the processing of the first file data using the third value;

based at least in part on the second metric data, determining second file data to include the first file data and the third value; and processing the second file data using the second model.

10. The computer-implemented method of claim 5, further comprising:

receiving second metric data associated with the first model;

receiving first data indicating a number of values to test for the first parameter;

receiving second data indicating a desired improvement in performance of the first model with respect to the first parameter;

processing the second data with respect to the first metric data and the second metric data;

determining the processing of the second data with respect to the first metric data and the second metric data satisfies the desired improvement; and storing the second model based at least in part on determining the processing of the first data with respect to the first metric data and the second metric data satisfies the desired improvement.

11. The computer-implemented method of claim 5, further comprising:

receiving a third model associated with a second parameter and a third parameter;

selecting a third value for the second parameter;

selecting a fourth value for the third parameter;

determining a fourth model corresponding to the first model with the second parameter having the third value and the third parameter having the fourth value;

processing second input data using the fourth model;

determining second metric data corresponding to the processing of the second input data using the fourth model; and based at least in part on the second metric data, storing the fourth model for processing future user inputs.

12. The computer-implemented method of claim 5, further comprising:

receiving, via an application program interface (API), the first model configured to perform natural language processing;

receiving, via the API, first data representing the first parameter;

receiving, via the API, second data representing a range of potential values for the first parameter; and receiving, via the API, the first input data representing a first set of natural language inputs.

13. The computer-implemented method of claim 5, further comprising:

based at least in part on determining the first output data corresponds to the undesired response to the first user input, determining a first metric type resulting in the undesired response; and based on the first metric type, determining that the undesired response is associated with the first parameter.

14. A system comprising:

at least one processor; and at least one memory including instructions that, when executed by the at least one processor, cause the system to:

generate, using a first model, first output data responsive to a first user input, wherein the first model is associated with a first parameter having a first value;

determine the first output data corresponds to an undesired response to the first user input;

based at least in part on determining the first output data corresponds to the undesired response to the first user input, determine a second model corresponding to the first model with the first parameter having a second value;

process first input data using the second model;

determine first metric data corresponding to the processing of the first input data using the second model; and based at least in part on the first metric data, store the second model for processing future user inputs.

15. The system of claim 14, wherein the instructions that, when executed by the at least one processor, further cause the system to:

determine first data associating the first metric data and the first value;

based at least in part on determining the first output data corresponds to the undesired response to the first user input, determine a third model corresponding to the first model with the first parameter having a third value;

process the first input data using the third model;

determine second metric data associated with the processing of the first input data using the third model;

determine second data associating the second metric data and the third value; and determine a set of values to test for the first parameter using at least the first data and the second data.

16. The system of claim 15, wherein the instructions that, when executed by the at least one processor, further cause the system to:
select a fourth value from the set of values;
determine a fourth model corresponding to the first model with the first parameter having the fourth value;
select a fifth value from the set of values;
determine a fifth model corresponding to the first model with the first parameter having the fifth value;
process the first input data using the fourth model; and
process the first input data using the fifth model at least partially in parallel with the fourth model processing the first input data.

17. The system of claim 14, wherein the instructions that, when executed by the at least one processor, further cause the system to:
select a third value for a second parameter associated with the first model;
determine a third model using the first value and the third value;
process the first input data using the third model;
determine second metric data corresponding to the processing of the first input data using the third model;
select a fourth value for the second parameter;
determine a fourth model using the first value and the fourth value;
process the first input data using the fourth model;
determine third metric data corresponding to the processing of the first input data using the fourth model;
determine a difference between the second metric data and the third metric data; and
based on the difference, ceasing evaluation of the second parameter for the first model.

18. The system of claim 14, wherein the instructions that, when executed by the at least one processor, further cause the system to:
receive first file data including second input data, wherein the first model is to be configured to process the second input data;
select a third value for a second parameter corresponding to the first file data;
process the first file data using the first model with the second parameter having the third value;
determine second metric data associated with the processing of the first file data using the third value;
based at least in part on the second metric data, determine second file data to include the first file data and the third value; and
process the second file data using the second model.

19. The system of claim 14, wherein the instructions that, when executed by the at least one processor, further cause the system to:
receive second metric data associated with the first model;
receive first data indicating a desired improvement in performance of the first model with respect to the first parameter;
process the first data with respect to the first metric data and the second metric data;
determine the processing of the first data with respect to the first metric data and the second metric data satisfies the desired improvement; and
store the second model based at least in part on determining the processing of the first data with respect to the first metric data and the second metric data satisfies the desired improvement.

20. The system of claim 14, wherein the instructions that, when executed by the at least one processor, further cause the system to:
receive a third model associated with a second parameter and a third parameter;
select a third value for the second parameter;
select a fourth value for the third parameter;
determine a fourth model corresponding to the first model with the second parameter having the third value and the third parameter having the fourth value;
process second input data using the fourth model;
determine second metric data corresponding to the processing of the second input data using the fourth model; and
based at least in part on the second metric data, store the fourth model for processing future user inputs.

21. The system of claim 14, wherein the instructions that, when executed by the at least one processor, further cause the system to:
receive, via an application program interface (API), the first model configured to perform natural language processing;
receive, via the API, first data representing the first parameter;
receive, via the API, second data representing a range of potential values for the first parameter; and
receive, via the API, the first input data representing a first set of natural language inputs.

* * * * *